US012086315B2

(12) United States Patent
Nagata

(10) Patent No.: US 12,086,315 B2
(45) Date of Patent: Sep. 10, 2024

(54) INFORMATION PROCESSING APPARATUS, CONTROL METHOD OF INFORMATION PROCESSING APPARATUS, AND COMPUTER READABLE STORAGE MEDIUM

(71) Applicant: KONICA MINOLTA, INC., Tokyo (JP)

(72) Inventor: Akihiro Nagata, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 244 days.

(21) Appl. No.: 17/352,750

(22) Filed: Jun. 21, 2021

(65) Prior Publication Data
US 2022/0004259 A1 Jan. 6, 2022

(30) Foreign Application Priority Data
Jul. 1, 2020 (JP) .................. 2020-113697

(51) Int. Cl.
G06F 3/01 (2006.01)
G06F 3/041 (2006.01)
(Continued)

(52) U.S. Cl.
CPC ............ G06F 3/016 (2013.01); G06F 3/0412 (2013.01); G06F 3/0486 (2013.01); G06F 3/0488 (2013.01); *G06F 2203/04105* (2013.01)

(58) Field of Classification Search
CPC ...... G06F 3/016; G06F 3/0412; G06F 3/0486; G06F 3/0488; G06F 2203/04105;
(Continued)

(56) References Cited

U.S. PATENT DOCUMENTS 6,940,494 B2 * 9/2005 Hoshino ............. G06F 3/03547
345/173
8,314,777 B2 * 11/2012 Ikeda ..................... G06F 3/016
345/173
(Continued)

FOREIGN PATENT DOCUMENTS

| JP | 2006079238 A | 3/2006 |
| JP | 2010015239 A | 1/2010 |
| JP | 2015143024 A | 8/2015 |

OTHER PUBLICATIONS

Ki-Uk Kyung, Jun-Young Lee, Mandayam A. Srinivasan, Precise manipulation of GUI on a touch screen with haptic cues, retrieved from—https://ieeexplore.ieee.org/stamp/stamp.jsp?tp=&arnumber=4810865&tag=1, Apr. 3, 2009, 6 pages (Year: 2019).*
(Continued)

*Primary Examiner* — Yongjia Pan
(74) *Attorney, Agent, or Firm* — BUCHANAN INGERSOLL & ROONEY PC

(57) ABSTRACT

An image processing apparatus includes: a display that has a touch panel; a controller that displays on the display at least a portion of a predetermined object display area and an object that is at a determined position in the object display area; and a vibrator that performs a vibration operation to vibrate an operation surface of the touch panel. The controller controls the vibration operation by the vibrator. In response to a drag operation on the operation surface of the touch panel, the controller moves the object that is displayed on the display, and causes the vibrator to perform the vibration operation in a vibration mode depending on a moving amount of the object in response to the drag operation or depending on a position in the object display area of the object that is moved in response to the drag operation.

25 Claims, 21 Drawing Sheets

(51) Int. Cl.
  *G06F 3/0486* (2013.01)
  *G06F 3/0488* (2022.01)
(58) Field of Classification Search
  CPC ............ G06F 2203/014; G06F 3/0482; G06F 3/0485; G06F 3/04883; G06F 3/04886; G03G 15/5016
  See application file for complete search history.

(56) References Cited

U.S. PATENT DOCUMENTS

| | | | | |
|---|---|---|---|---|
| 8,687,023 | B2* | 4/2014 | Markiewicz | G06F 3/04883 345/173 |
| 8,698,759 | B2* | 4/2014 | Shin | G06F 3/04883 345/173 |
| 8,704,776 | B2* | 4/2014 | Kim | G06F 3/016 345/173 |
| 9,405,370 | B2* | 8/2016 | Yoshikawa | G06F 3/04883 |
| 9,772,762 | B2* | 9/2017 | Kim | G06F 3/04883 |
| 10,048,756 | B2* | 8/2018 | Cho | G06F 3/04845 |
| 10,120,540 | B2* | 11/2018 | Treskunov | G06F 3/0488 |
| 10,175,762 | B2* | 1/2019 | Robert | G06F 1/1684 |
| 10,359,850 | B2* | 7/2019 | Endo | G06F 3/0485 |
| 10,386,991 | B2* | 8/2019 | Liu | G06F 3/0486 |
| 10,394,328 | B2* | 8/2019 | Kang | G06F 3/0485 |
| 11,198,154 | B2* | 12/2021 | Shim | B06B 1/02 |
| 2009/0262091 | A1* | 10/2009 | Ikeda | G06F 3/0488 345/173 |
| 2009/0292990 | A1* | 11/2009 | Park | G06F 3/0485 715/830 |
| 2009/0322695 | A1* | 12/2009 | Cho | G06F 3/0488 345/173 |
| 2010/0188327 | A1* | 7/2010 | Frid | G06F 3/016 340/407.2 |
| 2011/0157052 | A1* | 6/2011 | Lee | G06F 1/1626 345/173 |
| 2012/0244914 | A1* | 9/2012 | Lundy | G06F 3/0237 345/173 |
| 2014/0145970 | A1* | 5/2014 | Cho | G06F 3/016 345/173 |
| 2014/0340316 | A1* | 11/2014 | Gu | G06F 3/0488 345/173 |
| 2014/0351698 | A1* | 11/2014 | Nakagawa | G06F 3/0485 715/702 |
| 2015/0253851 | A1* | 9/2015 | Oh | G06F 3/04883 345/179 |
| 2017/0083096 | A1* | 3/2017 | Rihn | G06F 3/04883 |
| 2017/0358181 | A1* | 12/2017 | Moussette | H04M 19/047 |
| 2018/0113512 | A1* | 4/2018 | Kang | G06F 3/04817 |
| 2018/0224993 | A1* | 8/2018 | Lee | G06F 3/0416 |
| 2018/0224998 | A1* | 8/2018 | Morofuji | G06F 3/0488 |
| 2018/0335937 | A1* | 11/2018 | Hauenstein | G06F 3/04883 |
| 2019/0346985 | A1* | 11/2019 | Roard | G06F 3/0486 |
| 2022/0207970 | A1* | 6/2022 | Mitsui | G08B 21/06 |

OTHER PUBLICATIONS

When dragging object (nearly) outside window, how to make window scroll automatically toward that direction, retrieved from—https://stackoverflow.com/questions/12653300/when-dragging-object-nearly-outside-window-how-to-make-window-scroll-automati, Sep. 29, 2012, 3 pages (Year: 2012).*

Anthony Bouchard, HapticScroll gives you haptic feedback when you scroll beyond iOS' scrolling limits, retrieved from—https://www.idownloadblog.com/2017/02/13/hapticscroll/, Feb. 12, 2017, 4 pages (Year: 2017).*

Reorder an array with drag and drop, retrieved from—https://stackoverflow.com/questions/46372425/reorder-an-array-with-drag-and-drop, Sep. 25, 2017, 4 pages (Year: 2017).*

Stop jQuery draggable from scrolling off screen, retrieved from—https://stackoverflow.com/questions/31282451/stop-jquery-draggable-from-scrolling-off-screen, Jul. 8, 2015, 2 pages (Year: 2015).*

Allow ability to scroll screen on drag, retrieved from—https://github.com/bevacqua/dragula/issues/327, Mar. 1, 2016, 12 pages (Year: 2016).*

Alex Reardon, Rethinking drag and drop, retrieved from—https://medium.com/@alexandereardon/rethinking-drag-and-drop-d9f5770b4e6b, Aug. 15, 2017, 16 pages (Year: 2017).*

Owen Mills, Swap Thresholds and Direction, retrieved from—https://github.com/SortableJS/Sortable/wiki/Swap-Thresholds-and-Direction, Apr. 7, 2019, 3 pages (Year: 2019).*

Sortable, retrieved from—https://web.archive.org/web/20190114164126/https://github.com/SortableJS/Sortable, Jan. 14, 2019, 11 pages (Year: 2019).*

Office Action (Notice of Reasons for Refusal) issued on Dec. 12, 2023, in corresponding Japanese Patent Application No. 2020-113697 and English translation of the Office Action. (13 pages).

* cited by examiner

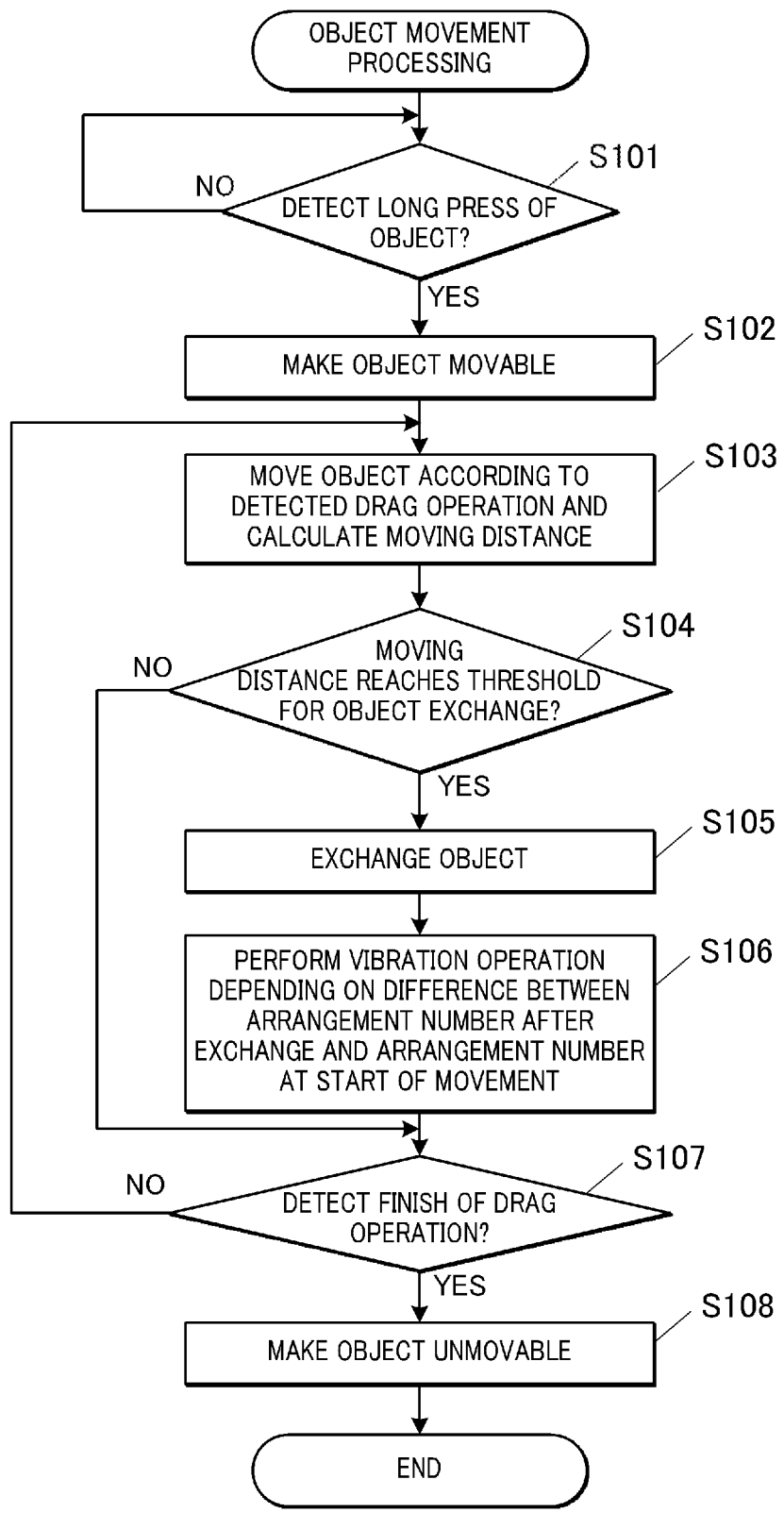

INFORMATION PROCESSING APPARATUS, CONTROL METHOD OF INFORMATION PROCESSING APPARATUS, AND COMPUTER READABLE STORAGE MEDIUM

CROSS-REFERENCE TO RELATED APPLICATIONS

The entire disclosure of Japanese Patent Application No. 2020-113697 filed on Jul. 1, 2020 is incorporated herein by reference in its entirety.

BACKGROUND

Technological Field

The present invention relates to an information processing apparatus, a control method of information processing apparatus, and a computer-readable storage medium.

Description of the Related Art

There has been a conventional technology in which a display with a touch panel is installed in an information processing apparatus, such that various displays are displayed on the display, and that the touch panel receives input operations according to the content displayed on the display. This technology has been applied to portable devices such as smartphones and tablet terminals, as well as input devices that accept user operations in stationary devices such as image forming apparatuses (printers, multifunction peripherals (MFPs), and the like) (for example, see JP 2015-143024 A).

In such information processing apparatuses, a plurality of objects such as operation buttons, which are the targets of operation using the touch panel, are displayed on the display, and processes corresponding to the object selected by the touch operation on the touch panel are executed. In some of such information processing apparatuses, the user can change the position and order of the objects. Changes in the position and order of the objects are usually performed in a series of operations (drag and drop operations) on the operation surface of the touch panel, in which the user moves an object by dragging, and then terminates the dragging operation.

The amount of movement of an object moved by a drag operation needs to be visually determined from the content of the display. However, it is not always easy to accurately determine the amount of movement of an object from the display content alone. For example, when the amount of movement of an object is large, such as when the movement of the object requires scrolling across the display screen, it is difficult to determine from the display screen the remaining amount of movement required to move the object to the desired position. Even when a supplementary display (for example, scroll bar) is provided to determine the amount of movement of the moving object, such a display may be hidden by fingers performing the dragging operation, and then the amount of movement of the object cannot be determined.

Thus, the above conventional technology has the problem that it is not easy to determine the amount of movement of an object by dragging operation.

SUMMARY

Objects of the present invention is to provide an information processing apparatus, a control method for the information processing apparatus, and a program that enable the amount of movement of an object by a drag operation to be determined more simply.

In order to achieve at least one of the abovementioned objects, according to an aspect of the present invention, there is provided an image processing apparatus including:
   a display that has a touch panel;
   a controller that displays, on the display, at least a portion of a predetermined object display area and an object that is at a determined position in the object display area; and
   a vibrator that performs a vibration operation to vibrate an operation surface of the touch panel;
   wherein the controller
     controls the vibration operation by the vibrator,
     in response to a drag operation on the operation surface of the touch panel, moves the object that is displayed on the display, and
     causes the vibrator to perform the vibration operation in a vibration mode depending on a moving amount of the object in response to the drag operation.

In order to achieve at least one of the abovementioned objects, according to another aspect of the present invention, there is provided an image processing apparatus including:
   a display that has a touch panel;
   a controller that displays, on the display, at least a portion of a predetermined object display area and an object that is at a determined position in the object display area; and
   a vibrator that performs a vibration operation to vibrate an operation surface of the touch panel;
   wherein the controller
     controls the vibration operation by the vibrator,
     in response to a drag operation on the operation surface of the touch panel, moves the object that is displayed on the display within the object display area, and
     causes the vibrator to perform the vibration operation in a vibration mode depending on a position in the object display area of the object that is moved in response to the drag operation.

In order to achieve at least one of the abovementioned objects, according to another aspect of the present invention, there is provided a control method of information processing apparatus that includes a display that has a touch panel and a vibrator that performs a vibration operation to vibrate an operation surface of the touch panel, the control method including:
   display controlling in which at least a portion of a predetermined object display area and an object that is at a determined position in the object display area are displayed on the display; and
   vibration controlling in which the vibration operation by the vibrator is controlled, wherein
   in the display controlling, in response to a drag operation on the operation surface of the touch panel, the object that is displayed on the display is moved, and
   in the vibration controlling, the vibrator performs the vibration operation in a vibration mode depending on a moving amount of the object in response to the drag operation.

In order to achieve at least one of the abovementioned objects, according to another aspect of the present invention, there is provided a control method of information processing apparatus that includes a display that has a touch panel and a vibrator that performs a vibration operation to vibrate an operation surface of the touch panel, the control method including:

display controlling in which at least a portion of a
predetermined object display area and an object that is
at a determined position in the object display area are
displayed on the display; and
vibration controlling in which the vibration operation by
the vibrator is controlled, wherein,
in the display controlling, in response to a drag operation
on the operation surface of the touch panel, the object
that is displayed on the display is moved in the object
display area, and
in the vibration controlling, the vibrator performs the
vibration operation in a vibration mode depending on a
position in the object display area of the object that is
moved in response to the drag operation.

In order to achieve at least one of the abovementioned objects, according to another aspect of the present invention, there is provided a non-transitory computer-readable storage medium storing a program causing a computer provided in an image forming apparatus that has a touch panel and a vibrator that performs a vibration operation to vibrate an operation surface of the touch panel as a computer to perform:

display controlling in which at least a portion of a
predetermined object display area and an object that is
at a determined position in the object display area are
displayed on the display; and
vibration controlling in which the vibration operation by
the vibrator is controlled, wherein
in the display controlling, in response to a drag operation
on the operation surface of the touch panel, the object
that is displayed on the display is moved, and
in the vibration controlling, the vibrator performs the
vibration operation in a vibration mode depending on a
moving amount of the object in response to the drag
operation.

In order to achieve at least one of the abovementioned objects, according to the other aspect of the present invention, there is provided a non-transitory computer-readable storage medium storing a program causing a computer provided in an image forming apparatus that has a touch panel and a vibrator that performs a vibration operation to vibrate an operation surface of the touch panel as a computer to perform:

display controlling in which at least a portion of a
predetermined object display area and an object that is
at a determined position in the object display area are
displayed on the display; and
vibration controlling in which the vibration operation by
the vibrator is controlled, wherein,
in the display controlling, in response to a drag operation
on the operation surface of the touch panel, the object
that is displayed on the display is moved in the object
display area, and
in the vibration controlling, the vibrator performs the
vibration operation in a vibration mode depending on a
position in the object display area of the object that is
moved in response to the drag operation.

BRIEF DESCRIPTION OF DRAWINGS

The advantages and features provided by one or more embodiments of the present disclosure will become more fully understood from the detailed description given hereinbelow and the appended drawings that are given by way of illustration only, and thus are not intended as a definition of the limits of the present invention, wherein:

FIG. 7 is a flowchart showing a control procedure of the object movement processing using the first control method of vibration response.

DETAILED DESCRIPTION OF THE EMBODIMENTS

Hereinafter, one or more embodiments of the present disclosure will be described in detail with reference to the drawings. However, the scope of the present invention is not limited to the disclosed embodiments or illustrated examples.

First Embodiment

The following is a description of a first embodiment of the information processing apparatus, control method for the information processing apparatus, and program of the present invention based on the drawings.

(Image Forming Apparatus Configuration)

Figure 1:
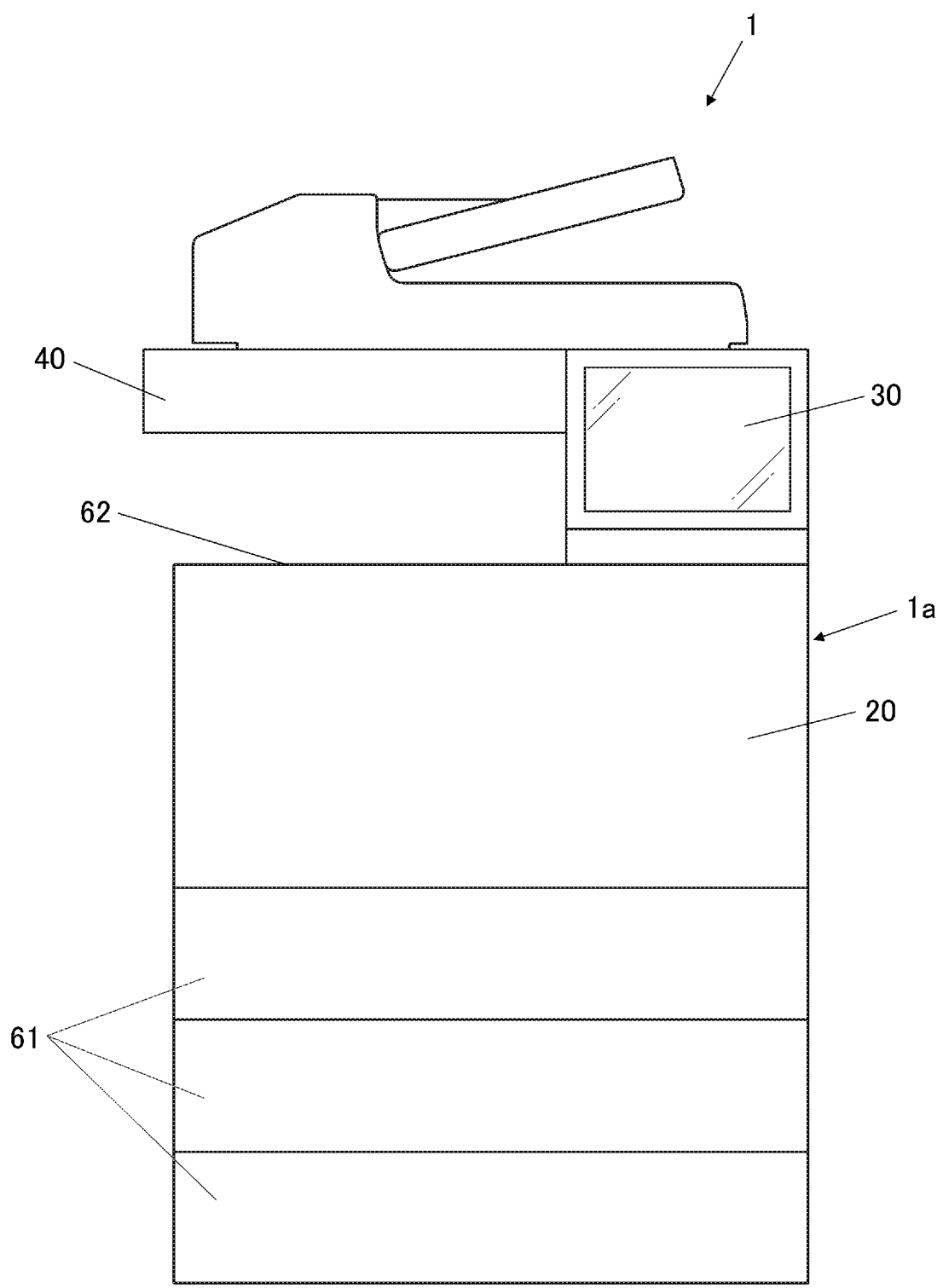
FIG. 1 shows a schematic configuration of an image forming apparatus.

FIG. 1 shows the schematic configuration of an image forming apparatus 1 according to an embodiment of the present invention.

The image forming apparatus 1 (information processing apparatus) is an MFP that forms color images using the electrophotographic method. The image forming device 1 includes a housing 1a, an image former 20, an operation display 30, a scanner 40, a sheet feeding tray 61, a sheet discharging tray 62, and the like.

Figure 2:
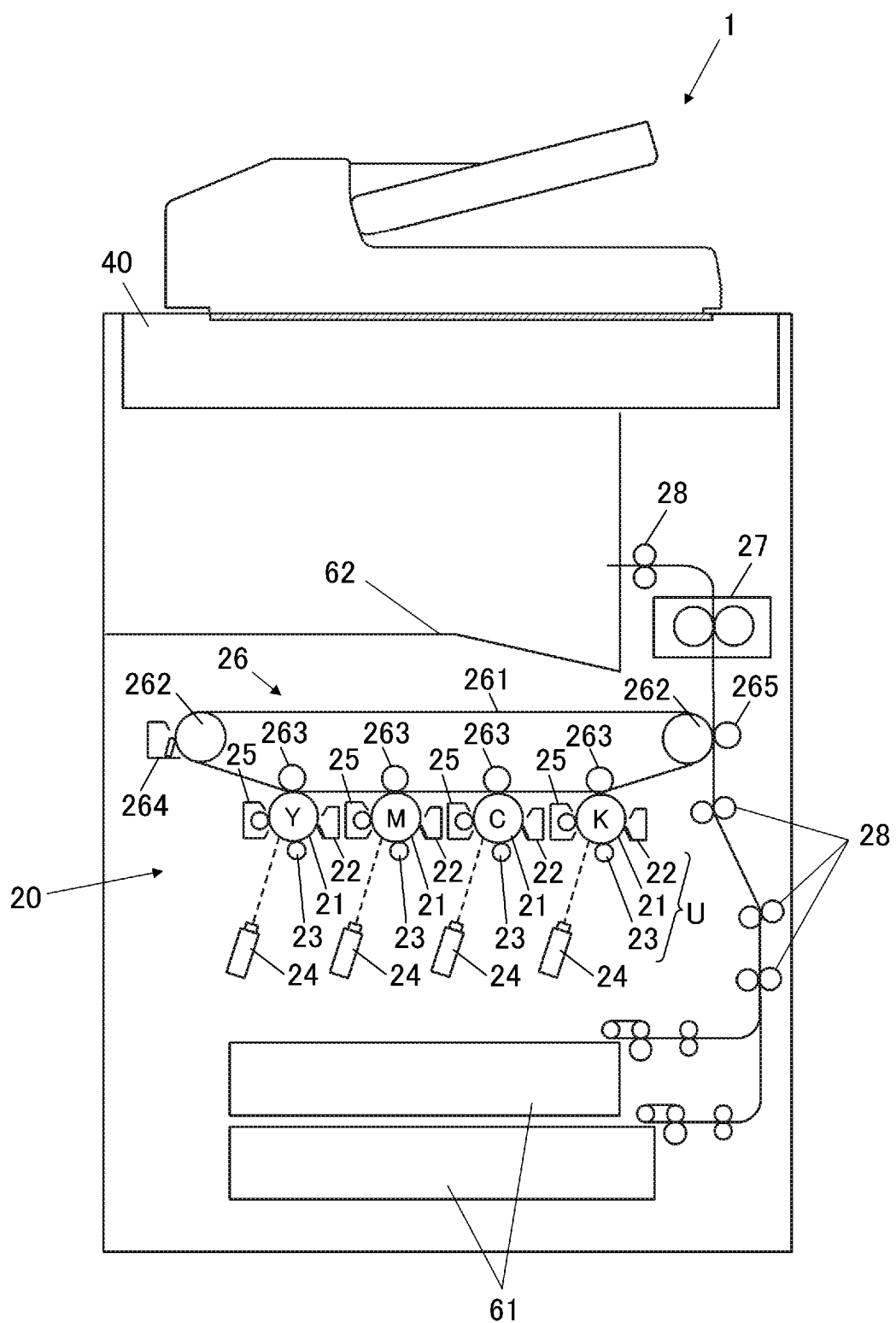
FIG. 2 shows a configuration of an image former.

FIG. 2 shows the configuration of the image former 20.

The image former 20 is installed inside the housing 1a, forms images on sheets (recording media) supplied from the sheet feeding tray 61, and discharges them to the sheet discharging tray 62.

The image former 20 includes the followings: an image carrier 21 that is a drum-shaped photoreceptor and carries an electrostatic latent image on its surface; a cleaning unit 22 that removes residual toner on the surface of the image carrier 21; a charging roller 23 that uniformly charges the surface of the image carrier 21; an exposure unit 24 that exposes the surface of the charged image carrier 21 to form an electrostatic latent image; a developing unit 25 that develops the electrostatic latent image using a developer containing toner to form a toner image on the surface of the image carrier 21; a transfer unit 26 that transfers the formed toner image to the intermediate transfer belt 261 in the transfer area as a primary transfer and then transfers it from the intermediate transfer belt 261 to the sheet as a secondary transfer; a fixing unit 27 that fixes the toner image on the sheet; a plurality of conveyance rollers 28 that convey the sheet in the conveyance path from the sheet feeding tray 61 to the sheet discharging tray 62; and the like. Among the above, the image carrier 21, the cleaning unit 22, the charging roller 23, the exposure unit 24, and the developing unit 25 constitute the imaging unit.

Four imaging units are provided for the respective colors of Y (yellow), M (magenta), C (cyan), and K (black), and are arranged in the order of Y, M, C, and K along the lower horizontal surface of the intermediate transfer belt 261. In each of the imaging units, the cleaning unit 22, charging roller 23, exposing unit 24, and developing unit 25 are arranged in this order along the outer surface of the image carrier 21.

The image carrier 21 rotates around a predetermined rotation shaft. A photosensitive layer is formed on the outer surface of the image carrier 21.

The cleaning unit 22 has a flat cleaning blade made of an elastic material, and, by bringing the cleaning blade into contact with the surface of the image carrier 21, removes toner and other foreign matter that has adhered to the surface of the image carrier 21 and remained without being transferred to the intermediate transfer belt 261.

The charging roller 23 is a cylindrical member that contacts the surface of the image carrier 21 and rotates in a driven manner in accordance with the rotation of the image carrier 21 around a predetermined rotation shaft. The charging roller 23 uniformly charges the surface of the image carrier 21 by applying a charging drive voltage from a power supply unit (not shown).

The exposure 24 includes an LD (Laser Diode) as a light emitting element and exposes the surface of the image carrier 21 charged by the charging roller 23 by irradiating it with laser light to form an electrostatic latent image on the image carrier 21.

The developing unit 25 includes a developing sleeve (developing roller) arranged so as to face the surface of the image carrier 21. The developing unit 25 supplies the developer containing toner supplied from a toner bottle (not shown) to the surface of the developing sleeve that is set to a predetermined developing bias potential, causes the toner in the developer at the surface of the developing sleeve to adhere to the electrostatic latent image on the surface of the image carrier 21, and forms a toner image on the surface of the image carrier 21.

The transfer unit 26 includes the followings: two belt conveyance rollers 262; four primary transfer rollers 263 arranged facing respective image carriers 21; an intermediate transfer belt 261 bridging around the belt conveyance rollers 262 and the primary transfer rollers 263; a belt cleaning unit 264 that removes residual toner on the intermediate transfer belt 261; and a secondary transfer roller 265 that is pressed against one belt conveyance roller 262 and rotates in a driven manner in accordance with the rotation of the belt conveyance roller 262.

In the transfer unit 26, the intermediate transfer belt 261 moves circumferentially while a bias voltage of a polarity opposite to the toner is applied to the primary transfer roller 263, such that the toner is transferred from the surface of the rotating image carrier 21 to the intermediate transfer belt 261. After the toner of each color (Y, M, C, and K) is transferred to the intermediate transfer belt 261 in an overlapping manner, the color toner image is transferred from the intermediate transfer belt 261 to the sheet by the sheet that has passed between the secondary transfer roller 265 to which a predetermined bias voltage is applied and the intermediate transfer belt 261. The toner that remains on the intermediate transfer belt 261 without being transferred to the sheet is removed by the cleaning blade of the belt cleaning unit 264.

The fixing unit 27 heats and presses the sheet on which the toner image has been transferred, so as to fix the toner image on the sheet. The fixing unit 27 includes a pair of rollers consisting of a heating roller and a pressure roller that sandwich the sheet. The sheet where the toner image has been fixed is conveyed by the conveyance roller 28 and is sent to the sheet discharging tray 62.

Figure 3:
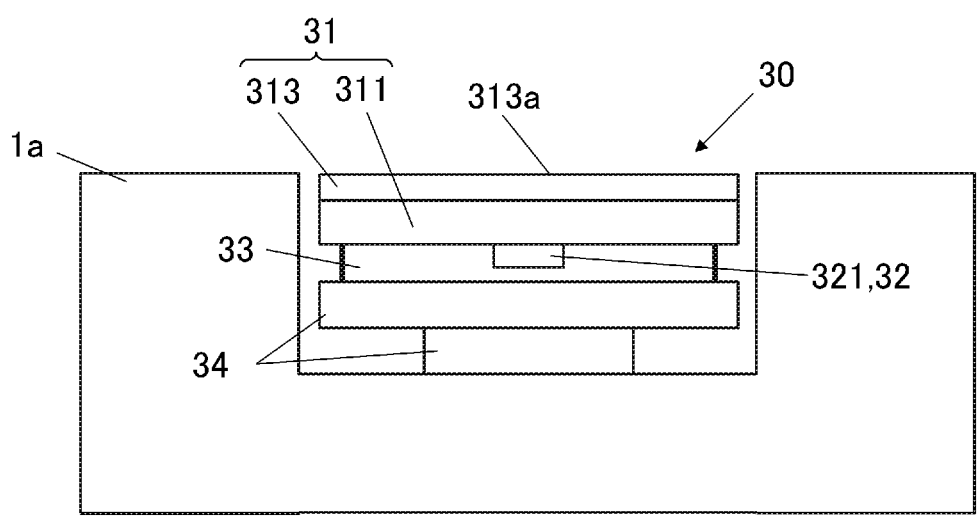
FIG. 3 is a cross-sectional view of an operation display.

FIG. 3 is a cross-sectional view showing a configuration of an operation display 30.

The operation display 30 includes a display 31, a vibrator 32, a vibration-absorbing member 33, a fixing member 34, and the like.

The display 31 has a display panel 311, a touch panel 313, and the like.

The display panel 311 may be, for example, a liquid crystal display device, but is not limited thereto. Other types of display devices such as an organic EL (Electro Luminescence) display device may be used. The display panel 311 is driven by a display panel driver 312 (see FIG. 4) under control by a controller 10 (see FIG. 4), and displays an operation screen 311a (see FIG. 5A to FIG. 5C) including objects 71 that are the target of contact operation against the touch panel 313, and an image forming apparatus 1, and a status screen that shows the status of the image forming apparatus 1.

The touch panel 313 is overlaid on and integrated with the display panel 311, and has an operation surface 313a that overlaps the display area of the touch panel 313. The touch panel 313 detects the contact of an operation means such as a user's finger or stylus with the operation surface 313a and the contact position thereof. The contact detection method of the touch panel 313 can be, for example, a capacitance method that detects the contact position of the operation means based on the change in capacitance with the operation means. However, the contact detection method is not limited to this, and may also include a resistive layer method that detects the contact position of the operation means based on the contact point between electrodes.

The touch panel 313 of the present embodiment is also capable of detecting changes in the contact area on the operation surface 313a of the operation means and changes in pressure that the operation surface 313a receives from the operation means. The contact area can be detected from the area where the capacitance with the operation means changes. The method of detecting the pressure is not limited to any particular method, but for example, an electrode is provided on a member such as glass that is slightly curved when pressed, and the pressure is detected based on the change in electrostatic capacitance between the electrode and another reference electrode.

The vibrator 32 has a vibration element 321 that converts electrical signals into physical vibrations and other components. The vibration element 321 is attached to the back of the touch panel 313. The vibration element 321 is driven by a vibration driver 322 (see FIG. 4) and vibrates under control by the controller 10. The vibration of the vibration element 321 propagates to the operation surface 313a through the display panel 311 and the touch panel 313. When a finger (operation means) is in contact with the operation surface 313a when the vibration propagates to the operation surface 313a, the user perceives this vibration as a vibration response from the operation display 30. In this way, the vibrator 32 having the vibration element 321 performs vibration operation to vibrate the operation surface 313a of the touch panel.

The position of the vibration element 321 and the method of vibration are not limited to the above. For example, the vibration element 321 may be attached to a surface of the display panel 311 on the side of the touch panel 313 at a position that does not overlap the display screen.

The vibration-absorbing member 33 is provided between the back surface of the display 31 and the fixing member 34 and suppresses propagation of the vibration of the display 31 in response to the vibration operation of the vibrator 32 to the fixing member 34.

The fixing member 34 is attached to the display 31 via the vibration absorbing member 33 and is fixed to the housing 1a.

The operation display 30 having such configurations receives the contact operation from the user on the touch panel 313 as an input operation, converts the input operation into an operation signal, and outputs operation signal to the controller 10. In addition, in response to the received input operation, the operation display 30 notifies the user of the vibration operation of the vibrator 32 (hereinafter referred to as a vibration response).

The scanner 40 shown in FIG. 1 has an automatic document conveyer, an image reader, a placing tray, a platen glass, and the like. The automatic document conveyer has a placing tray to place the document sheets, a mechanism to convey the document sheets, and a conveyance roller(s) to convey the document sheets in a predetermined conveyance path. The image reader includes an optical system, such as a light source and a reflector, and an imaging element. The image reader reads the image of the document sheet conveyed along the predetermined conveyance path or placed on the platen glass, and generates image data in bitmap format for each of the R (red), G (green), and B (blue) colors. The scanner 40 reads the image of the document sheet under the control of the controller 10, generates the image data, and stores it in a storage 13 (see FIG. 4).

Figure 4:
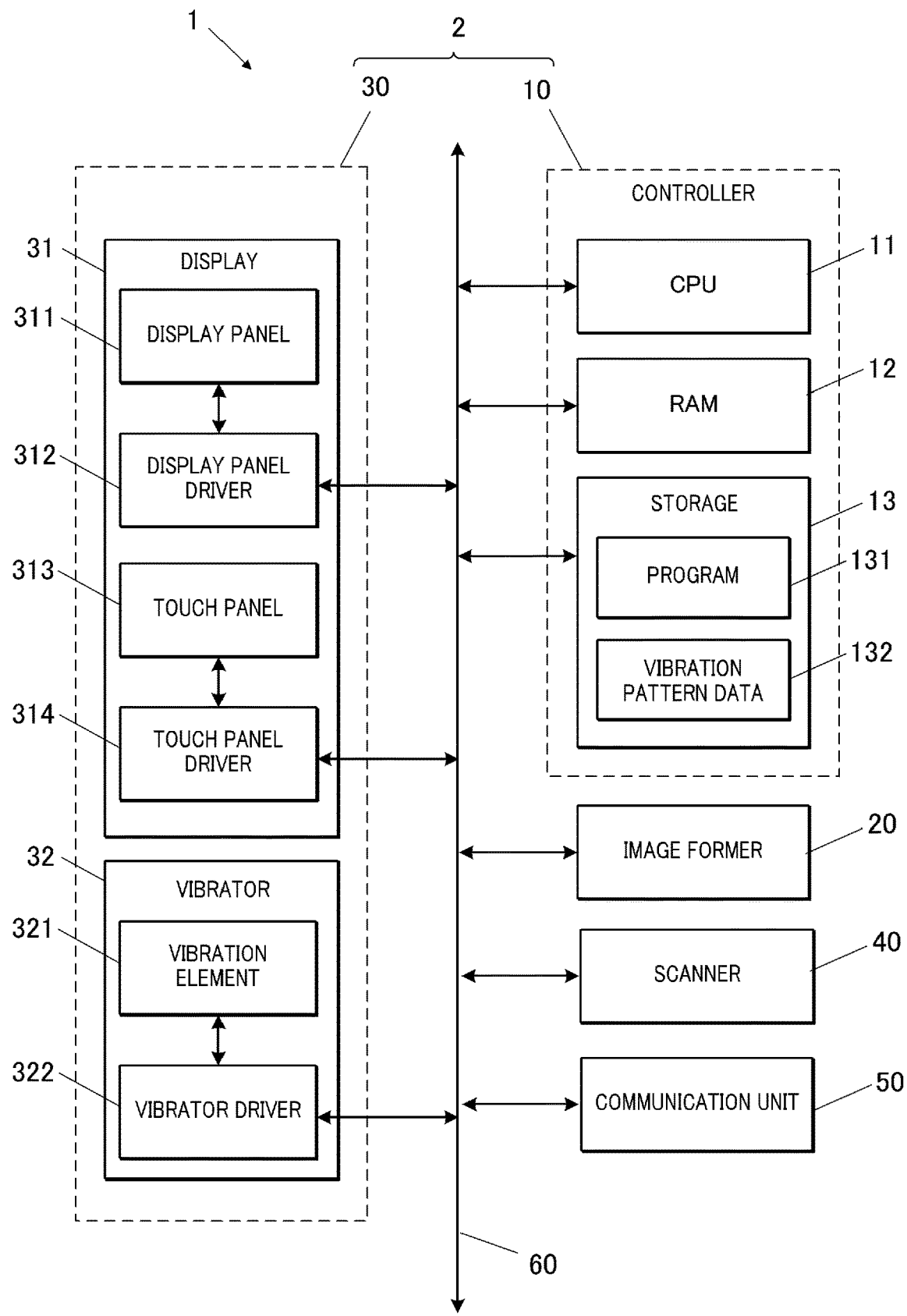
FIG. 4 is a block diagram showing a main functional configuration of the image forming apparatus.

FIG. 4 is a block diagram showing the main functional configuration of the image forming apparatus 1.

The image forming apparatus 1 includes the controller 10, the image former 20, the operation display 30 with the display 31 and the vibrator 32, the scanner 40, a communication unit 50, and a bus 60. Among these, the display 31 includes the display panel 311, the display panel driver 312, the touch panel 313, and the touch panel driver 314. The vibrator 32 includes the vibration element 321 and the vibration driver 322. Each part of the image forming apparatus 1 is connected by the bus 60.

The controller 10 and the operation display 30 constitute the input device 2. In the following, explanations will be omitted for the configurations already described.

The controller 10 includes a CPU 11 (Central Processing Unit), a RAM 12 (Random Access Memory), and the storage 13. The controller 10 functions as a display control means and a vibration control means by having the CPU 11 executing the program 131 stored in the storage 13 and performing various processes.

The CPU 11 reads and executes the program 131 stored in the storage 13 and performs various arithmetic operations.

The RAM 12 provides the CPU 11 with a memory space for work and stores temporary data.

The storage 13 is configured with a non-volatile storage device such as HDD (Hard Disk Drive), SSD (Solid State Drive), and a flash memory, and stores the program 131 executed by the CPU 11, various data, and the like. The data stored in the storage 13 includes image data acquired by the scanner 40, image data input from outside via the communication unit 50, vibration pattern data 132, and the like. The vibration pattern data 132 represents a plurality of vibration patterns of the vibration operation by the vibrator 32.

The controller 10 having the CPU 11, the RAM 12, and the storage 13 comprehensively controls each part of the image forming apparatus 1 according to the program 131.

For example, the controller 10 operates each part of the image former 20 based on the image data stored in the storage 13 to form an image on a sheet.

The controller 10 also sends a control signal to the display panel driver 312 to cause the display panel 311 to display the operation screen, status screen, and the like described above.

Also, the controller 10 sends control signals to the touch panel driver 314 and receives detection signals from the touch panel driver 314. In this way, the controller 10 detects the contact position, contact pressure, and contact area of the operation means against the operating surface 313a of the touch panel 313.

The controller 10 also sends a control signal based on the vibration pattern data 132 to the vibration driver 322 so as to vibrate the vibration element 321 at an appropriate timing, strength and vibration pattern.

The communication unit 50 is configured with a network card and the like. The communication unit 50 is connected to a communication network, such as a LAN (Local Area Network), and sends and receives information from external devices on the communication network. The controller 10 communicates with the external devices on the communication network via the communication unit 50.

(Operation of Image Forming Apparatus)

Next, the operation of the image forming apparatus 1 will be explained, focusing on the movement of the objects on the operation screen 311a of the input device 2 and the vibration response that accompanies the movement of the objects.

The display panel 311 of the input device 2 displays the operation screen 311a (display screen) for receiving input operations from the user.

Figure 5A:
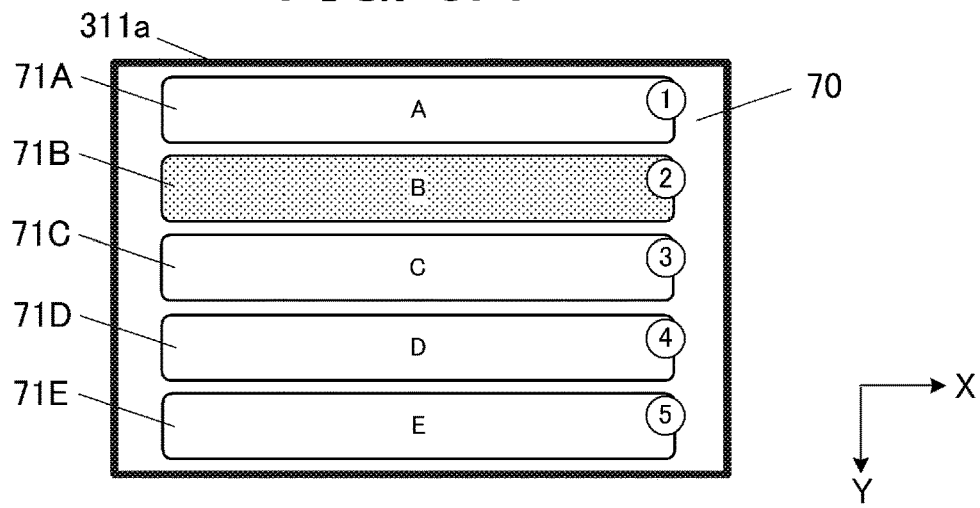
FIG. 5A to FIG. 5C are schematic diagrams showing an operation screen.
Figure 5B:
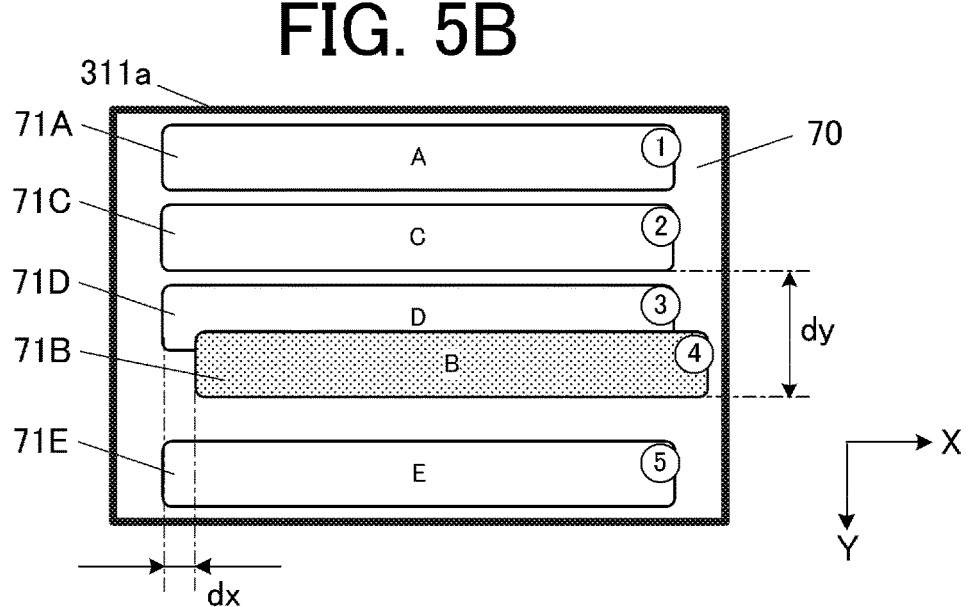
Figure 5C:
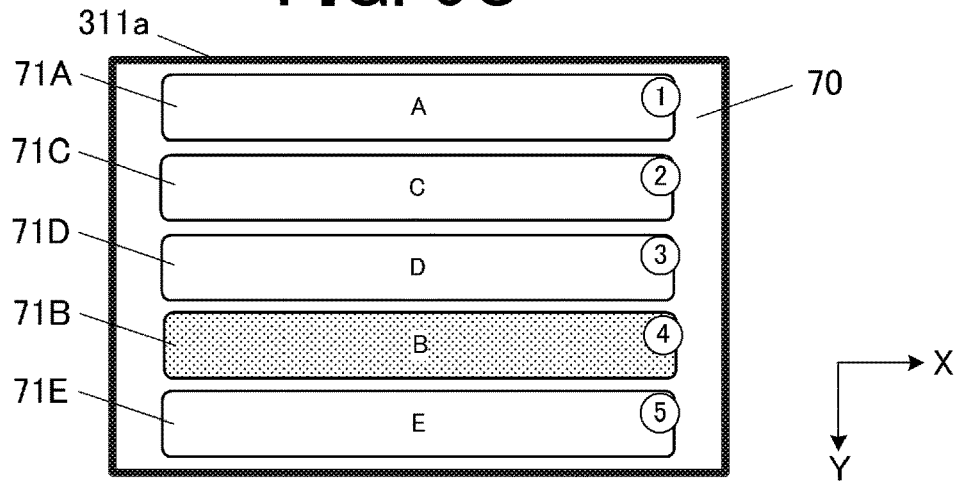

FIG. 5A to FIG. 5C are schematic diagrams showing the operation screen 311a.

As shown in FIG. 5A, in the operation screen 311a, a plurality of objects 71A-71E that are the targets of input operations are displayed arranged in a single row in the Y direction in FIG. 5A. In the following, when any one or more objects are indicated, it will be referred to as "the object(s) 71". The area in which the objects 71A-71E are arranged is referred to as an object display area 70. In the example of FIG. 5A, the entire object display area 70 is displayed on the operation screen 311a.

Each object 71 is, for example, an operation button to make the image forming apparatus 1 perform a predetermined operation, to change the mode of the operation, or to set the operation of the image forming apparatus 1. When the touch panel 313 detects a contact operation to the area of any one of the objects 71 displayed on the display panel 311, the controller 10 determines that an input operation to select the object 71 has been made, and executes processing corresponding to the object 71.

The objects 71 are each associated with one of the arrangement numbers from "1" to "5". In the object display area 70, a plurality of objects 71 are arranged and displayed in the order according to the arrangement numbers. In other words, the positions of the respective objects 71 in the object display area 70 are determined by the arrangement numbers. In FIG. 5A to FIG. 5C, the number surrounded by a circle indicates the arrangement number of each object 71. However, these numbers are shown only for explanation purposes, and the arrangement numbers are not displayed in the actual operation screen 311a.

In the example of FIG. 5A, the objects 71A to 71E are associated with the arrangement numbers "1" to "5" respectively, the objects 71A to 71E are arranged in the order of the arrangement numbers from the edge in the −Y direction to the +Y direction of in the object display area 70.

Also, in the image forming apparatus 1 of this embodiment, the arrangement order of the objects 71A to 71E can be changed by the user to a desired order. The procedure for changing the arrangement order of the objects 71A to 71E is as follows.

First, when the user performs a long press on the object 71 to be repositioned, the object 71 enters a "rearrange mode" (the first mode) and becomes selected and movable. Here, the long press is an operation to continue a contact operation on a fixed position on the operation surface 313a for a predetermined time or longer.

After the object 71 enters the rearrange mode, by performing a drag operation while the object 71 remains selected, the selected object 71 can be moved according to the drag operation. Here, the drag operation is an operation to move the contact position while continuing to be in contact with the operation surface 313a.

After the drag operation is started and the moving distance of the object 71 in the Y direction reaches the predetermined threshold for object exchange, the arrangement number of the object 71 is exchanged for that of the neighboring object 71, and the objects 71A to 71E are displayed with the exchanged arrangement number. The threshold for object exchange may be, for example, the moving distance when the positional relationship between the center position of the moving object 71 and the center position of the adjacent object 71 is reversed with respect to the Y direction. For example, when the object 71B in the state of FIG. 5A is moved in the +Y direction so that the center position of the object 71B is on the +Y direction side of the center position of the adjacent object 71C, the arrangement number of the object 71B is changed from "2" to "3", and the arrangement number of the object 71C is changed from "3" to "2". Then, the respective objects 71 are displayed in the sequence order of 71A, 71C, 71B, 71D, and 71E according to the changed arrangement number. However, since the position of the object 71B is not finalized during the drag operation, the object 71B is displayed at the contact position during the drag operation.

FIG. 5B shows that object 71B has been moved further in the +Y direction and its position has been exchanged for that of the object 71D. In FIG. 5B, the arrangement number of object 71B is "4", and the arrangement number of object 71D is "3". When the drag operation is finished in this state (i.e., when the operation means is released from the operation surface 313a), the arrangement number of the object 71B is finalized as "4", the object 71B is automatically aligned and arranged at the position between the objects 71D and 71E as shown in FIG. 5C, and thus the arrangement order is finalized. When the drag operation is finished, the mode switches from the rearrange mode to a "normal mode" in which the object 71 is not moved, and the object 71 is ready to receive input operations. The operation to finish the drag operation is also called a drop operation.

In this embodiment, when the object 71 is moved in response to the drag operation, the vibrator 32 performs a vibration operation in a vibration mode depending on the moving amount of the object in the object display area 70. The user can intuitively recognize (grasp) the moving amount of the object by the vibration response of the operation surface 313a caused by this vibration operation.

In the following, various modes of control method of vibration response will be explained.

(First Control Method of Vibration Response)

In the first control method of the vibration response, each time the object 71 is exchanged, the vibration element 321 vibrates with a vibration pattern depending on the exchange count. In other words, in the first control method of the vibration response, the moving amount of the object 71 selected in response to the drag operation is the exchange count of the position of the object 71 for that of other object(s) 71, and the vibration element 321 vibrates with a vibration pattern depending on this moving amount. The exchange count of the position of the object 71 can also be referred to as the number of other objects 71 that the moving object 71 crosses.

More specifically, when the arrangement number of the object 71 selected by the drug operation is exchanged for the arrangement number of another object 71, the difference between the arrangement number after the exchange (that is, the latest or most recent arrangement number) and the arrangement number at the start of the movement is defined as the moving amount of the object 71. The vibration element 321 vibrates with a different vibration pattern depending on this moving amount. Therefore, the "exchange count of the object" in this embodiment is not the cumulative exchange count but the minimum exchange count required for the object 71 to move from the initial position to the current position, when the object 71 moves back and forth in the +Y and −Y directions.

Figure 6A:
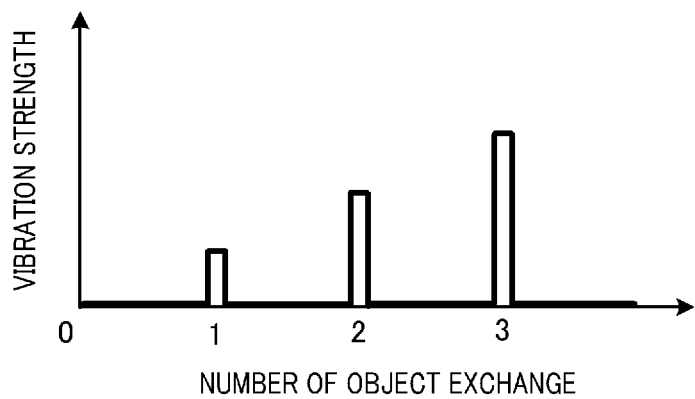
FIG. 6A to FIG. 6B show examples of vibration patterns in a first control method of vibration response.
Figure 6B:
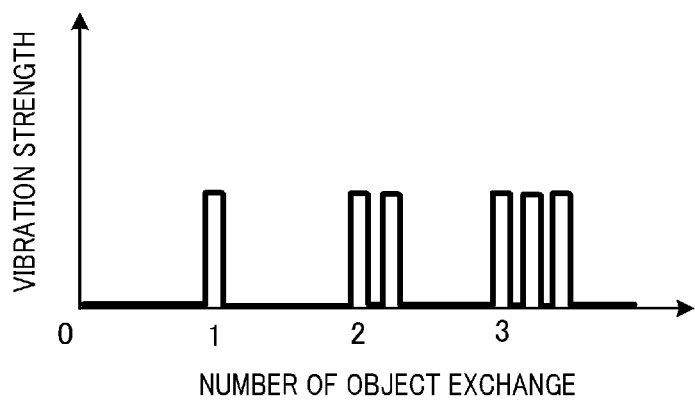

FIG. 6A to FIG. 6B show examples of the vibration pattern in the first control method of the vibration response.

In the example of FIG. 6A, the vibration element 321 vibrates each time the object 71 is exchanged, in a manner that the vibration strength increases as the exchange count of the object 71 increases. Therefore, when the object 71B is moved as shown in FIG. 5A and FIG. 5B, for example, the first vibration occurs when the position of the object 71B is exchanged for the position the object 71C, and then the second vibration with greater strength than the first one occurs when the position of the object 71B is exchanged for the position the object 71D. Thereafter, vibration occurs each time the object 71B is exchanged for another object 71, and its vibration strength increases. According to such vibration response, the user can intuitively recognize the moving amount of the object 71 up to that time based on the strength of the vibration.

In the example of FIG. 6B, the vibration element 321 vibrates each time the object 71 is exchanged, in a manner that the vibration count increases as the exchange count of the object 71 is increases. Therefore, when the object 71B is moved as shown in FIG. 5A and FIG. 5B, for example, the vibration occurs once when the position of the object 71B is exchanged for the position the object 71C, and then the vibration occurs twice when the position of the object 71B is exchanged for the position the object 71D. Thereafter, vibration occurs each time the object 71B is exchanged for another object 71, and the vibration count increases. Also according to such vibration response, the user can intuitively recognize the moving amount of the object 71 up to that time based on the count of the vibration. The vibration pattern is not limited to those shown in FIG. 6A and FIG. 6B. For example, the vibration pattern may be a combination of FIG. 6A and FIG. 6B. As an alternative vibration pattern, the duration of a single vibration may be extended as the exchange count of the object 71 increases. This vibration pattern may be combined with at least one of the vibration patterns of FIG. 6A and FIG. 6B.

Next, the control procedure of the object movement processing will be explained.

FIG. 7 is a flowchart showing the control procedure by the controller 10 of the object movement processing using the first control method of the vibration response.

When the object movement processing is started, the controller 10 determines whether or not a long press of the object 71 has been detected based on the detection signal from the display 31 (Step S101). If it is determined that a long press of the object 71 has not been detected ("NO" in step S101), the controller 10 executes the process of step S101 again.

If it is determined that a long press of the object 71 has been detected ("YES" in step S101), the controller 10 switches the operation mode of the image forming apparatus 1 from the normal mode to the rearrange mode, such that the object 71 selected by the long press becomes movable (step S102).

When a drag operation is performed while the object 71 is selected, the controller 10 moves the object 71 depending on the drag operation and calculates the moving distance (in this case, the moving distance in the Y direction) of the object depending on the detected drag operation (Step S103).

The controller 10 determines whether or not the calculated moving distance has reached the threshold for object exchange (step S104). If it is determined that the moving distance has reached the threshold ("YES" in step S104), the controller 10 exchanges the arrangement number of the selected object for that of the adjacent object 71, and makes each of the objects 71 be displayed in the position based on the arrangement number after the exchange. In this way, the controller 10 exchanges the display positions of the moving object 71 and the adjacent object 71 (step S105).

The controller 10 calculates the difference between the arrangement number after the exchange and the arrangement number at the start of the movement, and causes the vibrator 32 to perform the vibration operation depending on the difference based on the vibration pattern data 132 (Step S106). Since the difference in the arrangement number corresponds to the above mentioned exchange count of the object 71, the vibration operation is performed depending on the exchange count here. Even when the object 71 moves back and forth in the +Y and −Y directions, the vibration operation based on the above difference makes it possible to perform a vibration response in a vibration mode depending on the moving amount corresponding to the difference between the starting point of the movement and the current position.

When step S106 is finished, or if it is determined that the moving distance has not reached the threshold for object exchange in step S104 ("NO" in step S104), the controller 10 determines whether or not the operation means is released from the operation surface 313a, that is, whether or not the end of the drag operation is detected (step S107). If it is determined that the end of the drag operation has not been detected ("NO" in step S107), the controller 10 shifts to the process of step S103.

If it is determined that the end of the drag operation has been detected ("YES" in step S107), the controller 10 finalizes the arrangement number of the objects 71, aligns the respective objects 71, and makes the objects 71 unmovable. In addition, the operation mode is shifted to the normal mode (step S108).

When the process of step S108 is finished, the controller 10 ends the object movement processing.

In the flowchart of FIG. 7, steps S103, S104, S105, and S107 correspond to the "display control step", and step S106 corresponds to the "vibration control step".

(Second Control Method of Vibration Response)

Next, the second control method of vibration response will be explained.

In the second method of controlling the vibration response, the vibrator 32 continuously performs the vibration operation during the period when the drag operation is being performed (that is, the period when the object 71 is moving), and the vibration mode changes depending on the moving amount of the object 71. The moving amount in this case is the moving distance dy in the Y direction (the first direction) shown in FIG. 5B. The moving distance dx in the X direction (the second direction) is not used to control the vibration response. The "moving distance dy" is not the cumulative moving distance but the moving distance corresponding to the difference between the initial position to the current position, when the object 71 moves back and forth in the +Y and −Y directions.

Figure 8:
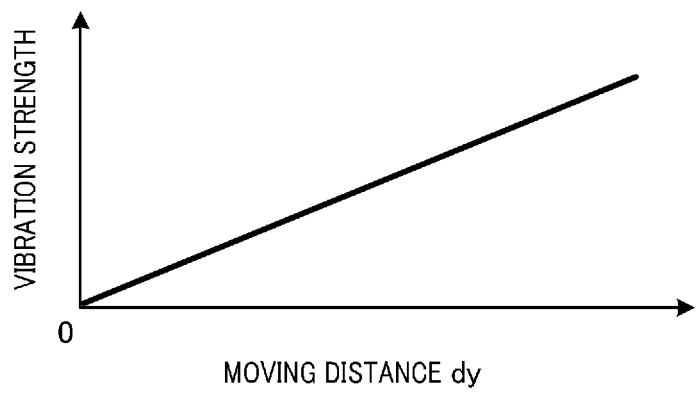
FIG. 8 shows an example of a change in vibration strength in a second control method of vibration response.

FIG. 8 shows an example of the change in vibration strength in the second control method of vibration response.

As shown in FIG. 8, in the second method of controlling the vibration response, the vibration strength continuously (in an analog manner) and incrementally increases as the moving distance dy in the Y direction of the object 71 increases. Alternatively, the vibration strength may be increased in a stepwise manner (in a digital manner) as the moving distance dy increases. According to such vibration response, the user can intuitively recognize the moving amount of the object 71 up to that time based on the strength of the vibration.

Figure 9:
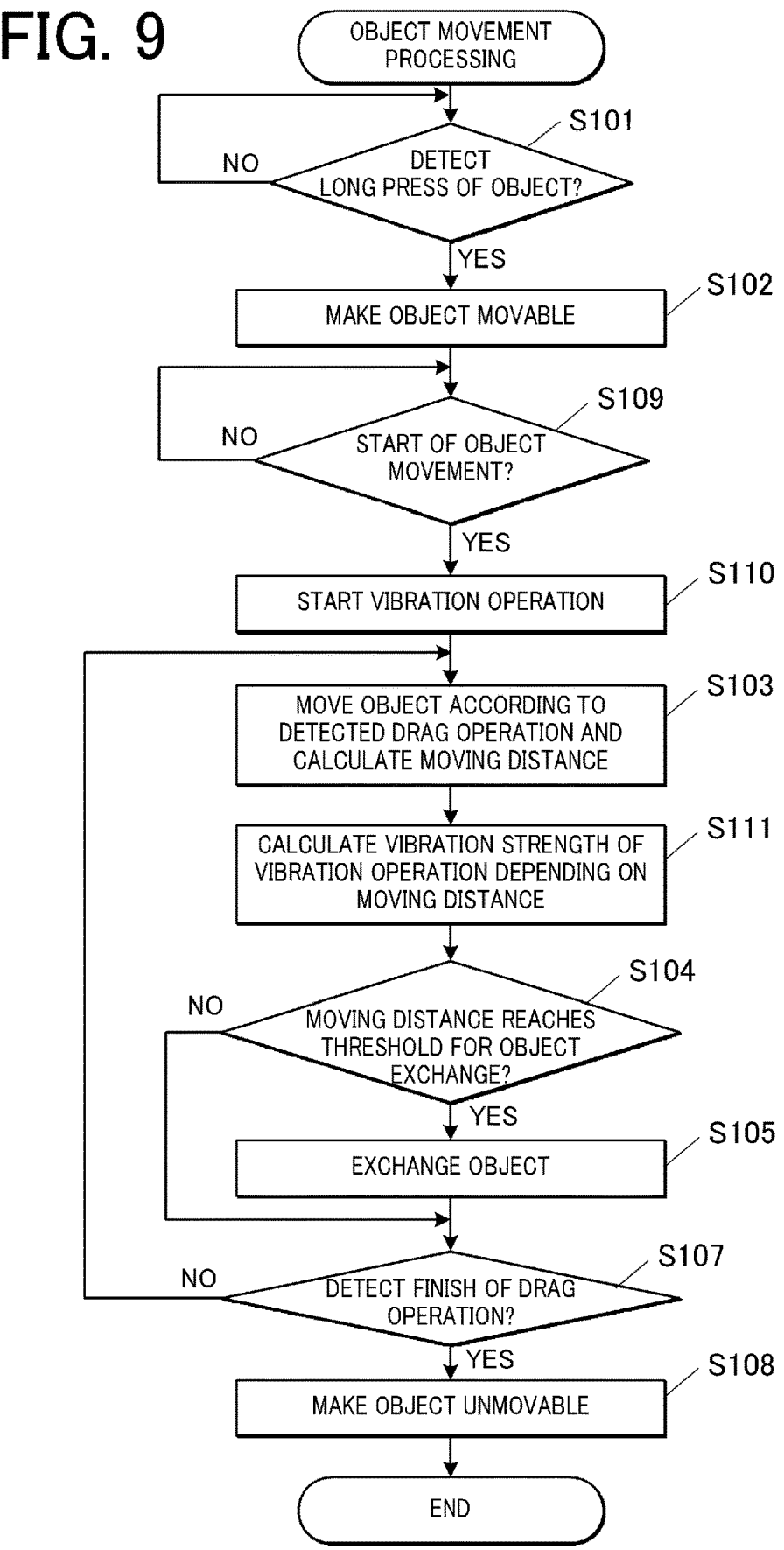
FIG. 9 is a flowchart showing a control procedure of the object movement processing using a second control method of vibration response.

FIG. 9 is a flowchart showing the control procedure by the controller 10 of the object movement processing using the second control method of the vibration response.

The flowchart of FIG. 9 corresponds to the flowchart of FIG. 7 with the addition of steps S109 to S111 and the deletion of step S106. In the followings, the differences from the flowchart in FIG. 7 will be explained.

In the object movement processing using the second control method of the vibration response, when the operation mode shifts to the rearrange mode and the object 71 becomes movable in step S102, the controller 10 determines whether or not the movement of the object 71 in response to the drag operation has started (step S109). If it is determined that the movement of the object 71 has not been started ("NO" in step S109), the controller 10 executes the process of step S109 again. If it is determined that the movement of the object 71 has been started ("YES" in step S109), the controller 10 causes the vibrator 32 to start the vibration operation (step S110).

The controller 10 calculates the moving distance of the object 71 in step S103, and changes vibration strength of the vibration operation depending on the calculated moving distance (step S111). Here, the vibration strength is changed such that the vibration strength increases with the increase of the moving distance. Each time the processes of steps S103, S111, S104, S105, and S107 are repeated, the vibration strength in step S111 is changed and the vibration strength can be continuously changed as shown in FIG. 8.

The subsequent processes are the same as those in the flowchart of FIG. 7.

In the flowchart of FIG. 7, steps S103, S104, S105, and S107 correspond to the "display control step", and steps S110 and S111 correspond to the "vibration control step".

(Third Control Method of Vibration Response)

Next, the third control method of vibration response will be explained.

In the third method of controlling the vibration response, the end of the drag operation is predicted based on the decreasing pressure that the operation surface 313a receives from the operation means or the decreasing contact area in the operation surface 313a by the operation means. When the end of the drag operation is predicted, the vibrator 32 performs a vibration operation in a vibration mode depending on the moving amount of the object 71. In other words, when the drag operation is about to end, the vibration response is made in a vibration mode depending on the moving amount of the object 71 up to that time. For example, the vibration operation is performed such that, the larger the moving amount, the larger the vibration strength. In alternative examples of vibration operation, the larger the moving amount, the more the vibration count, or the larger the moving distance, the longer the duration of the vibration.

Here, the moving amount may be the exchange count of the object 71, as in the first control method for the vibration response, or the moving distance dy in the Y direction for of the object 71, as in the second control method for the vibration response.

According to such a vibration response, the user can confirm whether or not the object 71 has been moved by the desired moving amount based on the vibration response.

Figure 10:
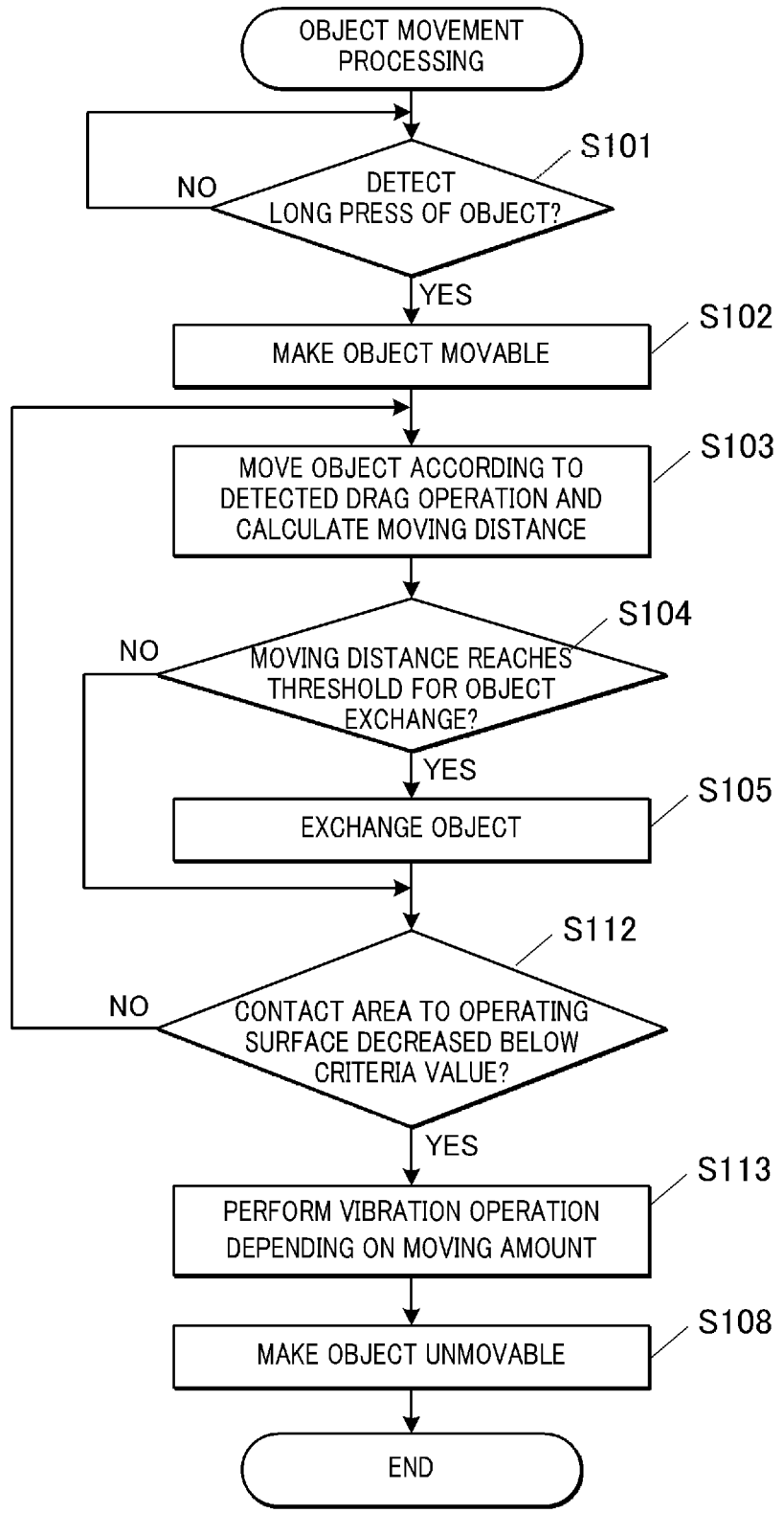
FIG. 10 is a flowchart showing a control procedure of the object movement processing using a third control method of vibration response.

FIG. 10 is a flowchart showing the control procedure by the controller 10 of the object movement processing using the third control method of the vibration response.

The flowchart of FIG. 10 corresponds to the flowchart of FIG. 7 with the deletion of steps S106 and S107 and the addition of steps S112 and S113. In the followings, the differences from the flowchart in FIG. 7 will be explained.

In the object movement processing using the third control method of the vibration response, when the process of step S105 is finished, or if it is determined that the moving distance has not reached the threshold for object exchange in step S104 ("NO" in step S104), the controller 10 determines, based on the detection signal received from the display 31, whether or not the contact area to the operation surface 313a by the operation means has decreased below a criteria value (step S112). If it is determined that the contact area has not decreased below the criteria value ("NO" in step S112), the controller 10 determines that the drag operation will continue and returns the process to step S103.

If it is determined that the contact area has decreased below the criteria value ("YES" in step S112), the controller 10 determines (predicts) that the drag operation will end, and causes the vibrator 32 to perform a vibration operation in a vibration mode depending on the moving amount of the object 71 up to that time (Step S113). After that, the controller 10 makes the objects 71 unmovable, shifts the operation mode to the normal mode (step S108), and ends the object movement processing.

In the flowchart of FIG. 10, steps S103, S104, S105, and S112 correspond to the "display control step", and step S113 corresponds to the "vibration control step".

According to the flowchart in FIG. 10, the end of the drag operation is predicted based on the contact area of the operation means, but as described above, the end of the drag operation may be predicted based on the decrease in the pressure that the operation surface 313a receives from the operation means. In this case, the controller 10 is required to determine, in step S112, whether the pressure that the operating surface 313a receives from the operation means has decreased to a predetermined criteria value or less.

(Fourth Control Method of Vibration Response)

Next, the fourth control method of vibration response will be explained.

In the fourth method of controlling the vibration response, when a stop of the drag operation is detected (that is, each time when the drag operation is stopped), the vibrator 32 performs a vibration operation in a vibration mode depending on the moving amount of the object 71 up to that time. In detail, when the movement of the operation means on the operation surface 313a is stopped and a contact operation is continuously performed on a fixed position, the vibration response is performed in the vibration mode depending on the moving amount of the object 71 up to that time. For example, the vibration operation is performed such that, the larger the moving amount, the larger the vibration strength. In alternative examples of vibration operation, the larger the moving amount, the greater the vibration count, or the larger the moving distance, the longer the duration of the vibration.

Here, the moving amount may be the exchange count of the object 71, as in the first control method for the vibration response, or the moving distance dy in the Y direction for of the object 71, as in the second control method for the vibration response.

According to such a vibration response, the user can receive the vibration response by stopping the drag operation and intuitively recognize the moving amount of the object 71 up to that time.

Figure 11:
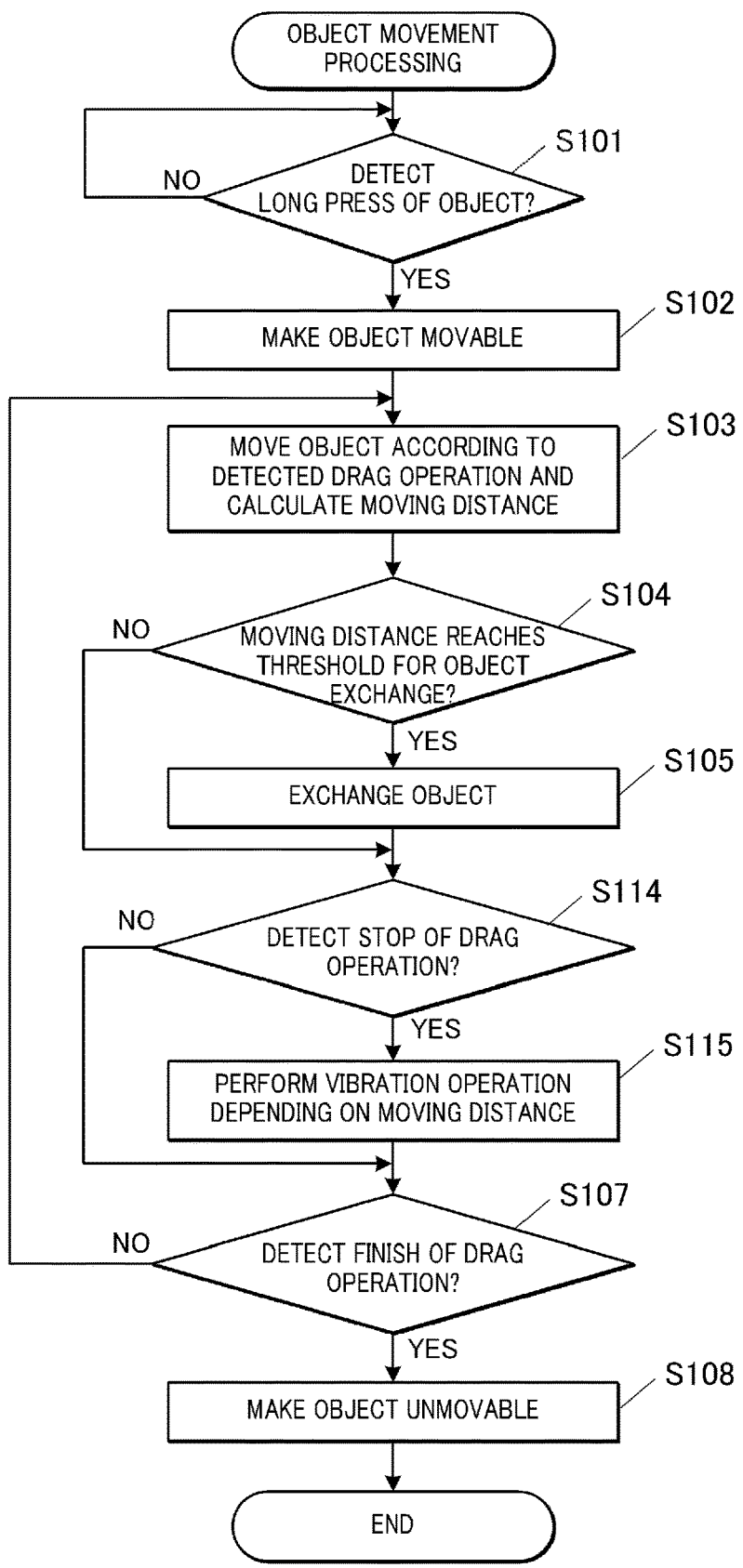
FIG. 11 is a flowchart showing a control procedure of the object movement processing using a fourth control method of vibration response.

FIG. 11 is a flowchart showing the control procedure by the controller 10 of the object movement processing using the fourth control method of the vibration response.

The flowchart of FIG. 11 corresponds to the flowchart of FIG. 7 with the deletion of step S106 and the addition of steps S114 and S115. In the followings, the differences from the flowchart in FIG. 7 will be explained.

In the object movement processing using the fourth control method of the vibration response, when step S105 is finished, or if it is determined that the moving distance has not reached the threshold for object exchange in step S104 ("NO" in step S104), the controller 10 determines, based on the detection signal received from the display 31, whether or not stop of the drag operation has been detected, that is, whether or not the contact position by the operation means has stopped moving (step S114).

If it is determined that drag operation has been stopped ("YES" in step S114), the controller 10 causes the vibrator 32 to perform a vibration operation in a vibration mode depending on the moving amount of the object 71 up to that time (step S115).

When the process of step S115 is finished, or if it is determined that drag operation has not been stopped in step S114 ("NO" in step S114), the controller 10 determines whether or not the end of the drag operation is detected (step S107).

The subsequent processes are the same as those in the flowchart of FIG. 7.

In the flowchart of FIG. 11, steps S103, S104, S105, and S107 correspond to the "display control step", and steps S114 and S115 correspond to the "vibration control step".

Next, modifications of the above embodiments will be explained. For each modification, the differences from the above embodiments will be mainly explained.

Modification 1

First, Modification 1 will be explained. This modification differs from the above embodiments in that the object display area 70 is larger than the operation screen 311a, and that the movement of the object 71 may also involve scrolling across the operation screen 311a.

FIGS. 12A, 12B, 13A, and 13B illustrate the movement of the object 71 with scrolling.

Figure 12A:
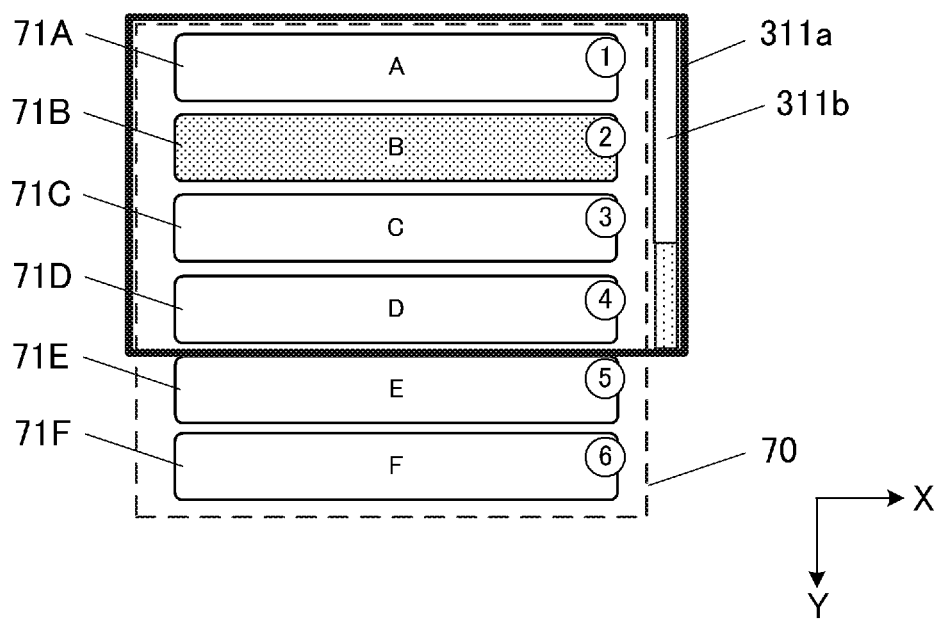
FIG. 12A to FIG. 12B illustrate the movement of objects with scrolling.

In this modification, as shown in FIG. 12A, the entire object display area 70 contains six objects 71A to 71F, and only four of these objects 71 can be displayed on the operation screen 311a. In other words, a portion of the object display area 70 is displayed on the operation surface 313a along with the four objects 71. The operation screen 311a also displays a scroll bar 311b that indicates the range of the object display area 70 that is displayed on the operation screen 313a.

Figure 12B:
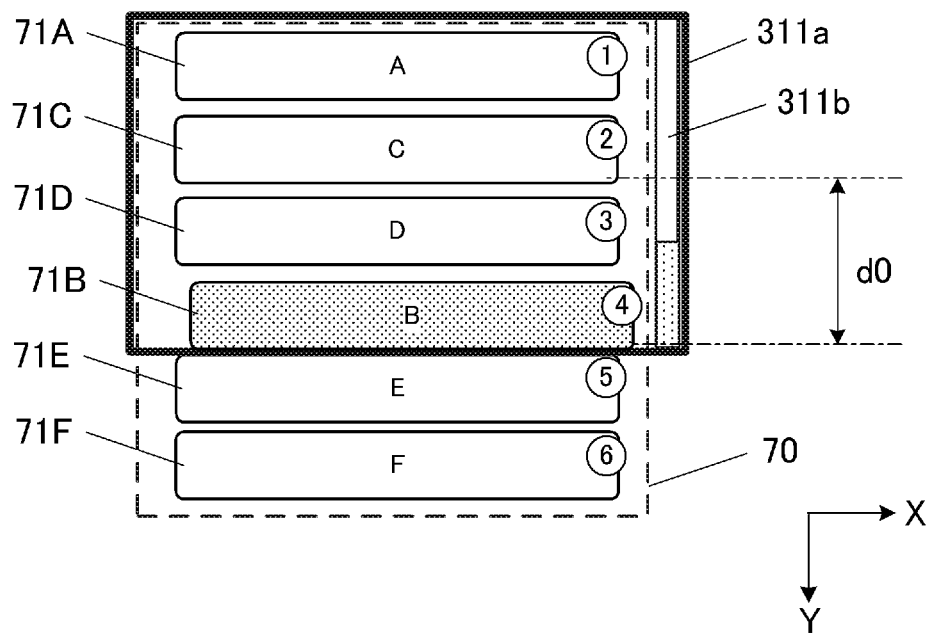
Figure 13A:
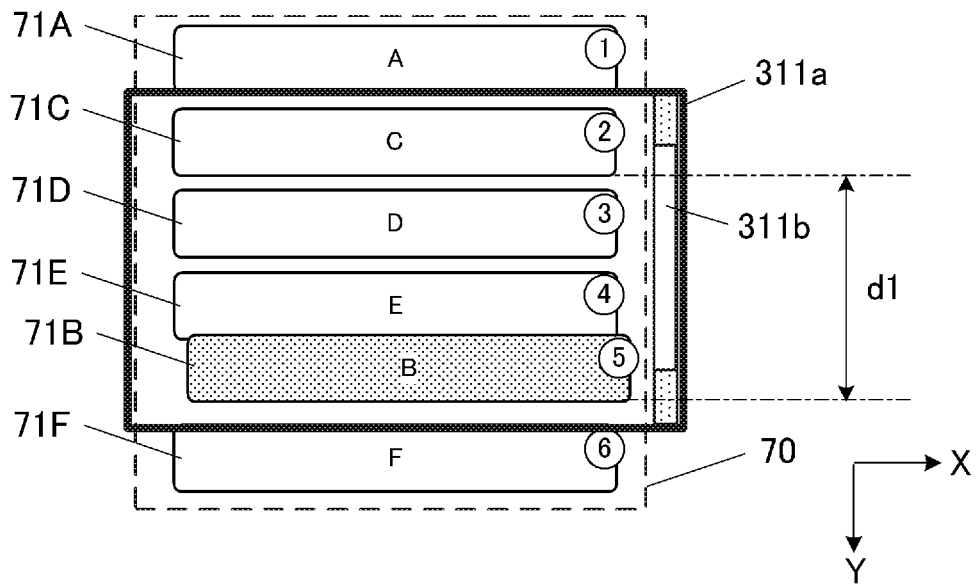
FIG. 13A to FIG. 13B illustrate the movement of objects with scrolling.
Figure 13B:
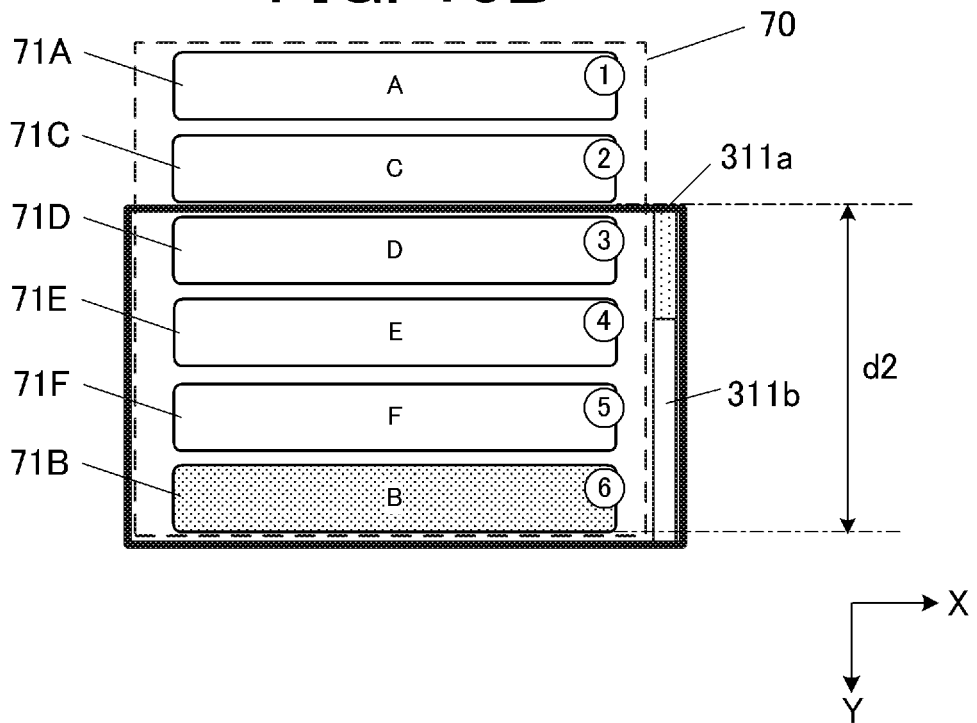

For example, the operation for moving the object 71B in the state of FIG. 12A in the +Y direction is as follows. In response to the drag operation, the object 71B is first moved to the edge in the +Y direction of the operation screen 311a, as shown in FIG. 12B. At that time, the moving distance of the object 71B in the Y direction is d0. When the drag operation is continued and the object 71B is moved to the undisplayed area of the object display area 70 (outside the area displayed on the operation screen 311a), as shown in FIG. 13A, the movement of the object 71B causes scrolling across the operation screen 311a. In response to this scrolling, the scroll bar 311b slides in the +Y direction. FIG. 13A shows that the object 71B has been exchanged for the object 71E with the scrolling of the operation screen 311a, and the moving distance of the object 71B in the object display area 70 is d1 at this time. As shown in FIG. 13B, when the object 71B moves to the edge in the +Y direction in the array, that is, to the position corresponding to the arrangement number "6," the scrolling stops. The moving distance of the object 71B in the object display area 70 is d2 at this time. In the period from FIG. 12B to FIG. 13B, the position of the object 71B does not change in the operation screen 311a, but changes in the object display area 70. Such movement is also an aspect of the movement of the object 71 depending on the drag operation.

When scrolling across the operation screen 311a occurs with movement of the object 71, the vibration response is controlled by the following control methods A or B.

Figure 14A:
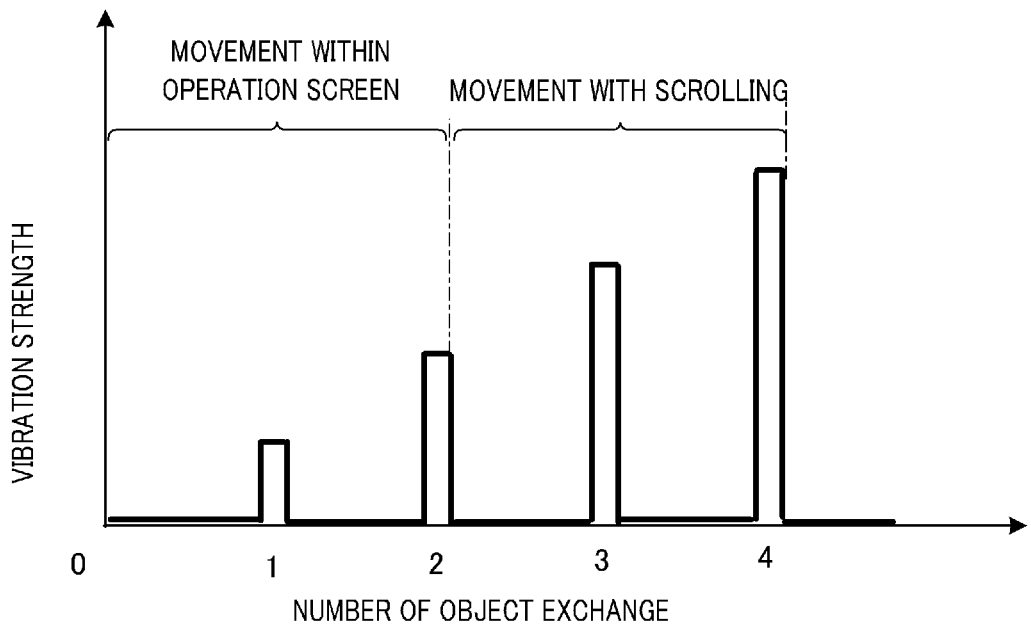
FIG. 14A to FIG. 14B show examples of a change in vibration pattern and vibration strength in a control method A of vibration response in Modification 1.
Figure 14B:
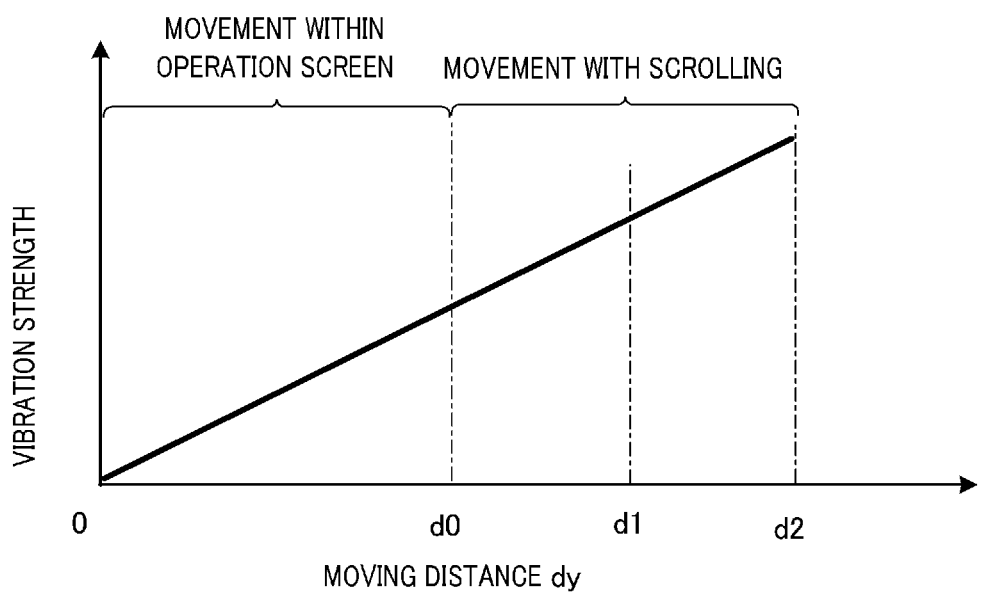

FIG. 14A and FIG. 14B show examples of changes in vibration pattern and vibration strength in control method A of Modification 1.

FIG. 14A shows the vibration pattern when the control method A of this modification is applied to the first control method of the vibration response described above. According to this vibration pattern, the vibration strength increases as the exchange count of the object 71 increases, from when the object 71 is moving within the operation screen 311a, to when movement of the object 71 is causing scrolling. The vibration strength is at its maximum when scrolling is caused and the exchange count is maximized, for example, when the object 71B reaches the end of the array of the objects 71 after the scrolling as shown in FIG. 13B (in this example, when the object has been exchanged four times).

FIG. 14B shows the change in vibration strength when the control method A of this modification is applied to the second control method of the vibration response described above. In this case, the vibration strength increases as the moving distance dy in the Y direction of the object 71 increases, from when the object 71 is moving within the operation screen 311a, to when movement of the object 71 is causing scrolling. The vibration strength is at its maximum when scrolling is caused and the moving distance dy is maximized, for example, in the state shown in FIG. 13B (in this example, when the moving distance dy in the Y direction is d2).

In this way, in the control method A of Modification 1, the vibration operation is performed in a predetermined limit vibration mode when the moving amount of the object 71 is the maximum possible moving amount that can result in scrolling across the operation screen 311a. An example of the limit vibration mode is the vibration mode with the maximum vibration strength as shown in FIG. 14A and FIG. 14B. Alternatively, it may be the vibration mode in which the repetition count of the vibration is maximized, the vibration mode in which duration of the vibration is the longest, or the like.

Figure 15A:
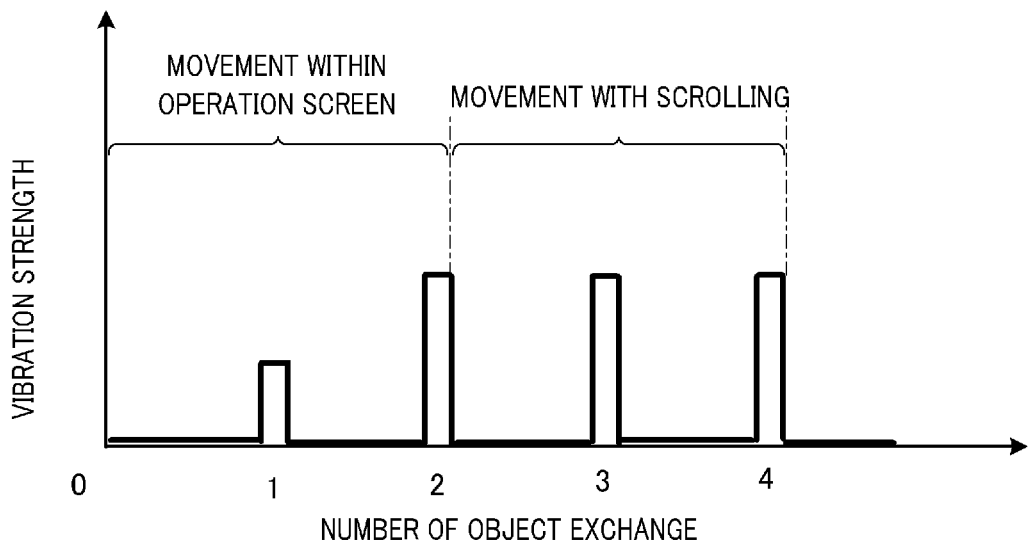
FIG. 15A to FIG. 15B show examples of a change in vibration pattern and vibration strength in a control method B of vibration response in Modification 1.
Figure 15B:
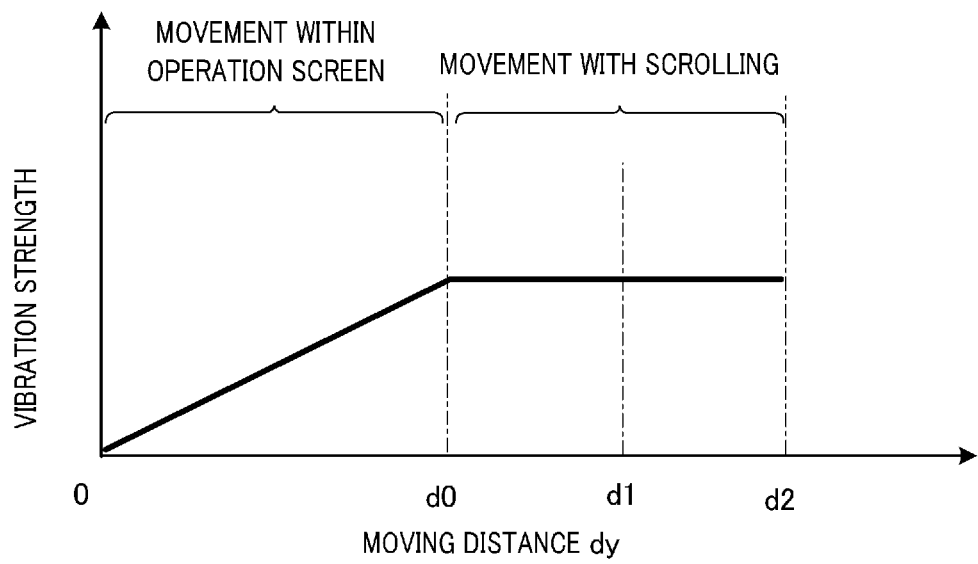

FIG. 15A and FIG. 15B show examples of changes in vibration pattern and vibration strength in control method B of Modification 1.

FIG. 15A shows the vibration pattern when the control method B of this modification is applied to the first control method of the vibration response described above. According to this vibration pattern, the vibration strength increases to the maximum as the exchange count of the object increases when the object 71 is moving within the operation screen 311a, and the vibration strength remains constant at its maximum value when movement of the object 71 is causing scrolling. For example, as shown in FIG. 12B, the vibration strength is the maximum when the object 71B reaches the end in the +Y direction of the array of the objects 71 in the operation screen 311a (in this example, when the object has been exchanged twice), and the vibration strength remains unchanged during the subsequent scrolling period as shown in FIG. 13A and FIG. 13B.

FIG. 15B shows the change in vibration strength when the control method B of this modification is applied to the second control method of the vibration response described above. In this case, the vibration strength increases to the maximum as the moving distance dy in the Y direction of the object increases when the object 71 is moving within the operation screen 311a, and the vibration strength remains constant at its maximum value when movement of the object 71 is causing scrolling. For example, as shown in FIG. 12B, the vibration strength is the maximum when the object 71B reaches the end in the +Y direction in the operation screen 311a (in this example, when the moving distance in the Y direction is d0), and the vibration strength remains unchanged during the subsequent scrolling period as shown in FIG. 13A and FIG. 13B.

In this way, in the control method B of Modification 1, the vibration operation is performed in the above-described limit vibration mode when the moving amount of the object 71 is the maximum possible moving amount within the displayed range of the operation screen 311a.

Modification 2

Next, Modification 2 will be explained. This modification differs from the above embodiments in that the objects 71 are arranged to form a matrix. This modification may be combined with Modification 1 above.

Figure 16A:
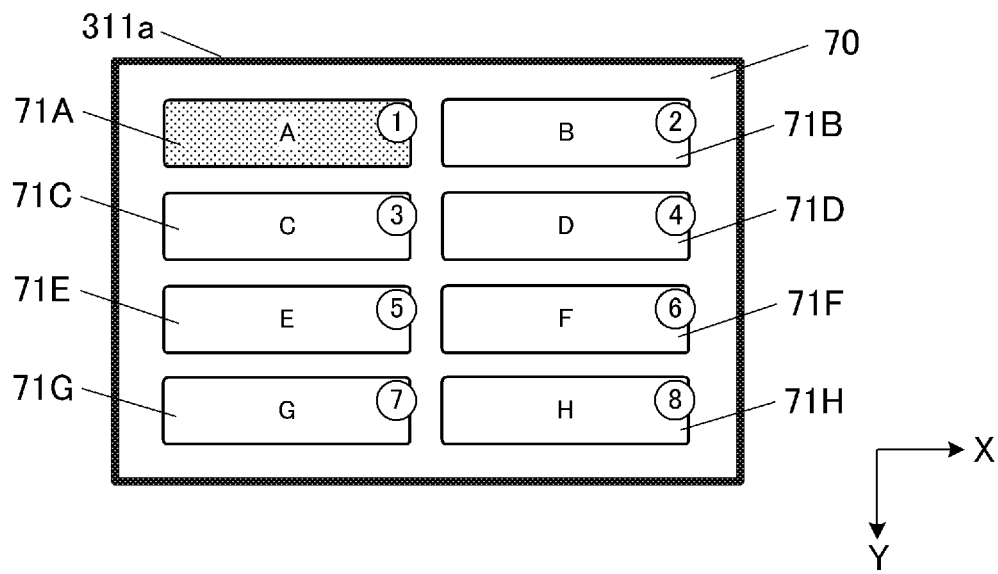
FIG. 16A to FIG. 16B are schematic diagrams showing arrangement and movement of objects in Modification 2.
Figure 16B:
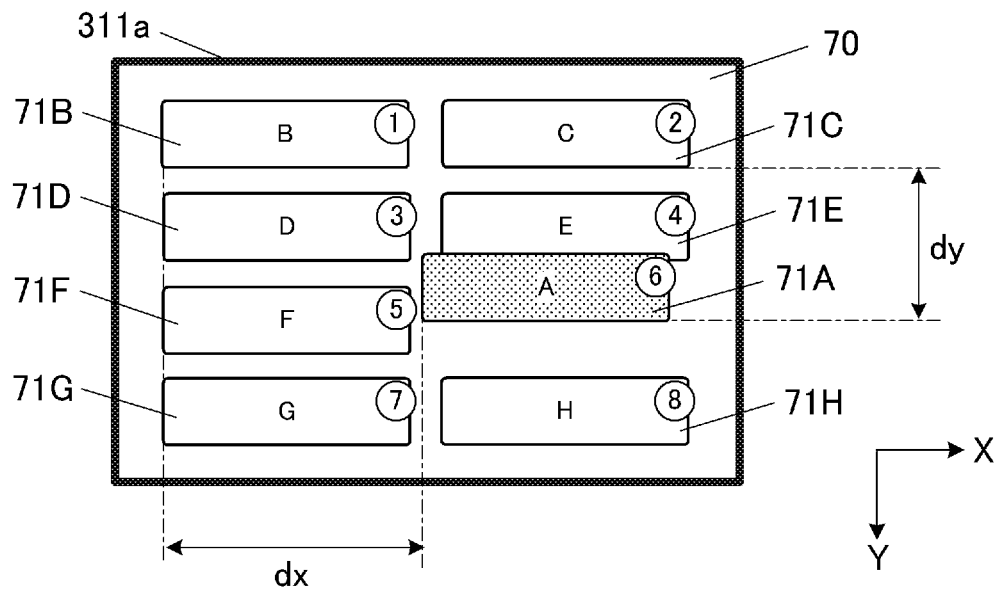

FIG. 16A and FIG. 16B are schematic diagrams showing the arrangement and movement of the objects 71 in Modification 2.

In FIG. 16A, the eight objects 71A-71H are arranged to form a matrix of four rows and two columns. The objects in respective rows of the matrix are arranged such that the objects closer to a predetermined edge of the matrix are associated with a smaller arrangement number. The objects in respective columns of the matrix are arranged such that the objects closer to another predetermined edge of the matrix are associated with a smaller arrangement number. Specifically, the arrangement numbers in the first row (the line at the end of the −Y direction) are "1" and "2" from the −X direction to the +X direction, the arrangement numbers in the second row are "3" and "4", the arrangement numbers in the third row are "5" and "6", and the arrangement numbers in the fourth row (the line at the end of the +Y direction) are "7" and "8". Namely, the arrangement numbers are arranged in a "Z" shape, in other words, when the arrangement numbers in ascending order are traced, the letter "Z" is drawn.

When the object 71 is moved in the Z shaped array, upon exchanging the arrangement number, the objects 71 are arranged in the Z shape according to the exchanged arrangement number. For example, as shown in FIG. 16B, when the object 71A is moved to the position with the arrangement number "6", the arrangement numbers of the objects 71B to 71F are changed from "2" to "6" to "1" to "5", and the eight objects 71 are arranged in the order of objects 71B, 71C, 71D, 71E, 71F, 71A, 71G, and 71H in the Z shape.

The control of the vibration response in Modification 2 can be any of the first to fourth control methods of the vibration response of the above embodiments. For example, when the first control method of vibration response is used, the vibration response is performed in the vibration mode depending on the exchange count each time the selected object 71 is exchanged.

Figure 17A:
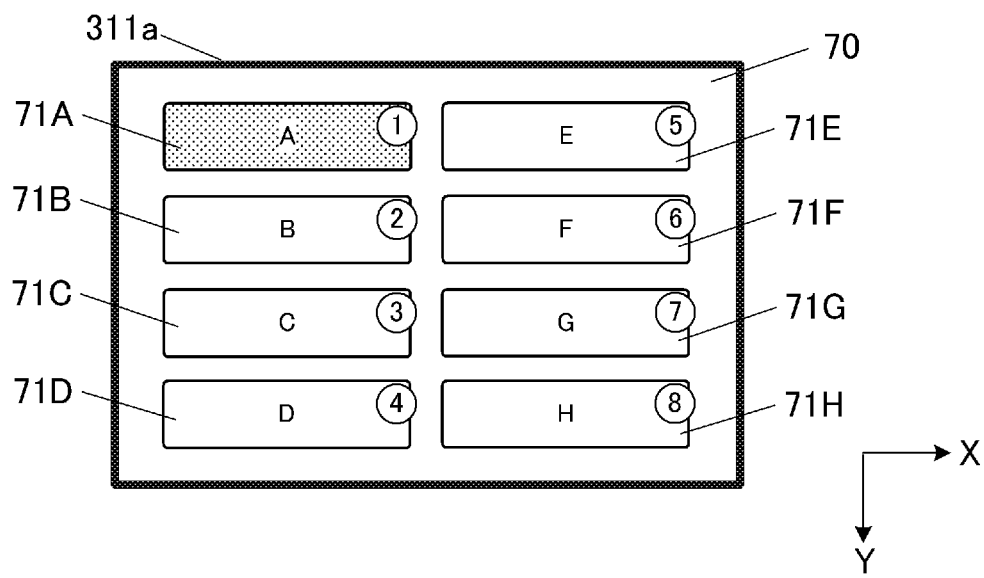
FIG. 17A to FIG. 17B are schematic diagrams showing another example of arrangement and movement of objects in Modification 2.
Figure 17B:
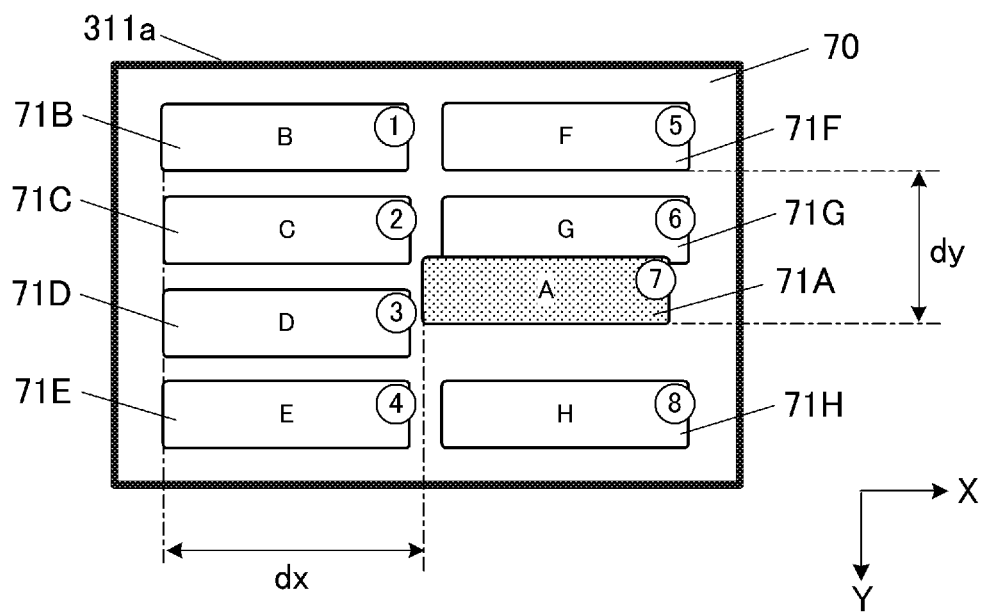

FIG. 17A and FIG. 17B are schematic diagrams showing another example of the arrangement and movement of the objects 71 in modification 2.

In FIG. 17A, the arrangement numbers in the first column (the line at the side of the −X direction) are "1" to "4" from the −Y direction to the +Y direction, and the arrangement numbers in the second column (the line at the side of the +X direction) are "5" to "8". Namely, the arrangement numbers are arranged in a "N" shape, in other words, when the arrangement numbers in ascending order are traced, the letter "N" is drawn.

When the object 71 is moved in the N shaped array, upon exchanging the arrangement number, the objects 71 are arranged in the N shape according to the exchanged arrangement number. For example, as shown in FIG. 17B, when the object 71A is moved to the position with the arrangement number "7", the arrangement numbers of the objects 71B to 71G are changed from "2" to "7" to "1" to "6", and the eight objects 71 are arranged in the order of objects 71B, 71C, 71D, 71E, 71F, 71G, 71A, and 71H in the N shape.

The control method for the vibration response is the same as the example shown in FIG. 16A and FIG. 16B.

In Modification 2, the moving amount used to control the vibration response is specified based on the moving distance of the object 71 in the Y direction and the moving distance in the X direction in the object display area 70. Alternatively, the moving amount may be specified based on the linear distance between the movement start position of the object 71 and the position of the object 71 that is moving in the object display area 70.

Modification 3

Next, Modification 3 will be explained. This modification differs from the above embodiments in that some object(s) are displayed only in the rearrange mode. This modification may be combined with Modification 1 and/or Modification 2 above.

FIG. 18A to FIG. 18D are schematic diagrams showing the arrangement and movement of the objects 71 in Modification 3. In FIG. 18A to FIG. 18D, the frame of the operation screen 311a and the frame of the object display area 70 are omitted.

Figure 18A:
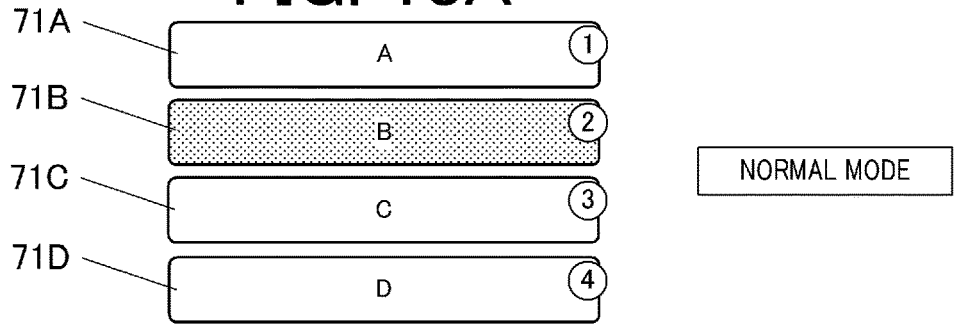
FIG. 18A to FIG. 18D are schematic diagrams showing arrangement and movement of objects in Modification 3.
Figure 18B:
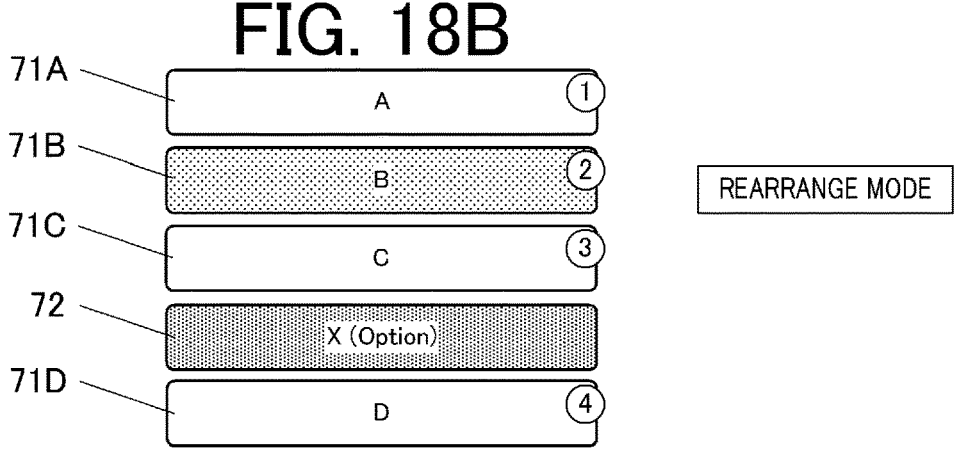
Figure 18C:
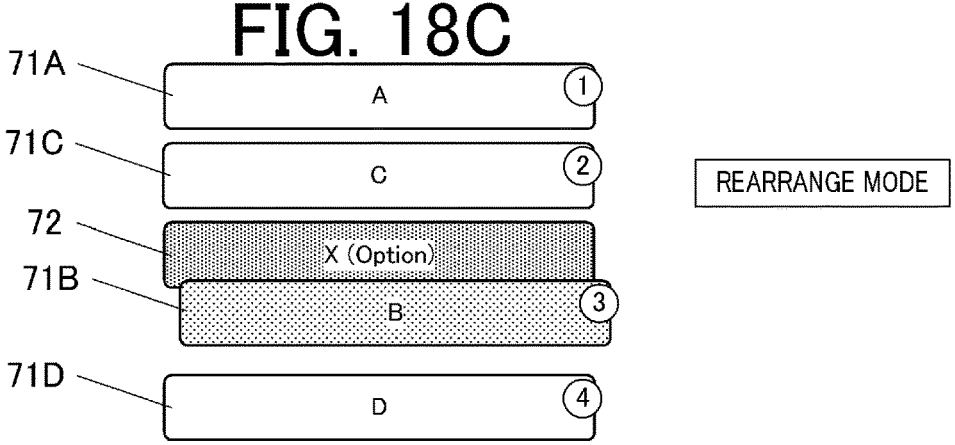
Figure 18D:
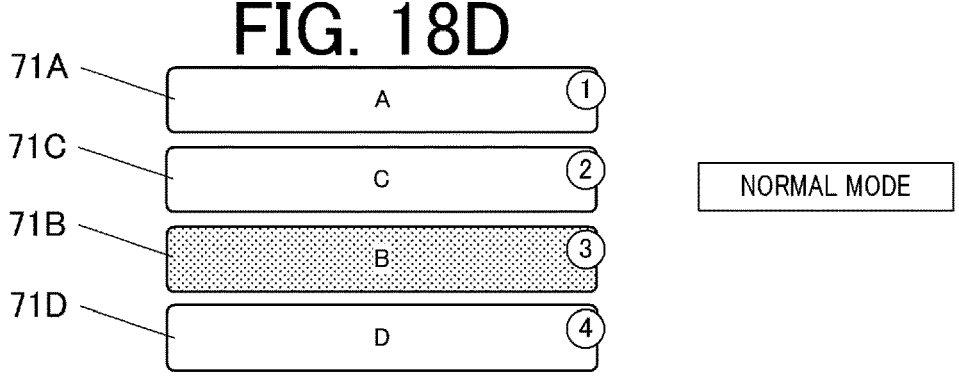

As shown in FIG. 18A, in the normal mode, four objects 71A-71D are arranged. When the operation mode is shifted to the rearrange mode with, for example, the object 71B being selected by a long press from these, as shown in FIG. 18B, a temporary set object 72 (a specific object) is displayed between the objects 71C and 71D. This temporary set object 72 is an object that is not displayed in the normal mode but displayed only in the rearrange mode.

The temporary set object 72 is, for example, an operation button for operating an optional device that has not yet been connected to the image forming apparatus 1 among optional devices that can be connected. Such a temporary set object 72 is displayed as an object 71 in both normal mode and rearrange mode while the optional device is connected, but it is displayed only in the rearrange mode while the optional device is not connected. Since the temporary set object 72 is displayed in the rearrange mode, the position where the object 71 will be displayed when the optional device is connected can be set in advance.

When an object 71 is moved while a temporary set object 72 is displayed, even when the object 71 is exchanged with the temporary set object 72, it is not used in the calculation of the moving amount. In other words, for example, when the object 71B in the state of FIG. 18B is moved and its position is exchanged with that of the object 71C, it is included in the exchange count as the moving amount and a vibration response is performed. On the other hand, when the position of the object 71B is exchanged with that of the temporary set object 72, it is not included in the exchange count as the moving amount and no vibration response is performed. With such control, the vibration response can be performed based on the moving amount that is converted to the moving amount in the arrangement in the normal mode. Therefore, the user can intuitively recognize the position of the object 71 when the operation mode returns to the normal mode.

Modification 4

Next, Modification 4 will be explained.

In the above embodiments and modifications, the position of the object 71 is changed within the object display area 70. Alternatively, the object 71 may be moved together with the object display area 70 so that the position of the object 71 in the object display area 70 is maintained. For example, when a position in the object display area 70 where no objects 71 are arranged (the background of the objects 71) is long-pressed such that the objects display area 70 and the objects 71 become movable, and then further drag operation is performed, the objects 71 can be moved together with the background. In other words, the object 71 can be moved together with a part of the object display area 70 by change in the range of the object display area 70 to be displayed on the operation screen 311*a* in response to the drag operation.

In this case, the vibrator 32 performs a vibration operation in a vibration mode depending on the moving amount of the object 71 in the operation screen 311*a* in response to the drag operation.

As described above, the image forming apparatus 1 as an information processing apparatus according to the first embodiment includes the display 31 that has a touch panel 313; the vibrator 32 that performs the vibration operation to vibrate an operation surface 313*a* of the touch panel 313; and the controller 10. The controller 10 (as the display control means) displays, on the display 31, at least a portion of the object display area 70 and the object 71 that is at a determined position in the object display area 70; controls the vibration operation by the vibrator 32 (as the vibration control means), in response to the drag operation on the operation surface 313*a* of the touch panel 313, moves the object 71 that is displayed on the display 31 (as the display control means), and causes the vibrator 32 to perform the vibration operation in a vibration mode depending on the moving amount of the object 71 in response to the drag operation (as the vibration control means).

According to such a configuration, the user can perceive the vibration response in the vibration mode depending on the moving amount of the object 71 from the operation surface 313*a*. Therefore, the user can easily and intuitively recognize the moving amount of the object 71 up to that time, while performing the drag operation.

Furthermore, the controller 10 (vibration control means) changes at least one of the vibration strength and vibration pattern in the vibration operation depending on the moving amount of the object 71. Therefore, the user can easily and intuitively recognize the moving amount of the object 71 up to that time based on the vibration strength or vibration pattern.

In the second control method of the vibration response, the controller 10 (vibration control means) continuously performs the vibration operation during the drag operation, and changes the vibration mode depending on the moving amount of the object 71. Therefore, the user can recognize the moving amount of the object 71 at any time based on the vibration response.

In the third control method of the vibration response, the controller 10 (vibration control means) predicts the end of the drag operation based on the decreasing pressure that the operation surface 313*a* receives from the operation means that is performing the drag operation or the decreasing contact area in the operation surface 313*a* by the operation means, and, when the end of the drag operation is predicted, causes the vibrator 32 to perform the vibration operation in a vibration mode depending on the moving amount. Therefore, the user can confirm whether or not the object 71 has been moved by the desired moving amount based on the vibration response.

In the fourth control method of the vibration response, when detecting a stop of the drag operation, the controller 10 (vibration control means) causes the vibrator 32 to perform the vibration operation in a vibration mode depending on the moving amount. Therefore, the user can receive the vibration response by stopping the drag operation and intuitively recognize the moving amount of the object 71 up to that time.

The controller 10 moves the object 71 to be displayed on the display 31 in the object display area 70 depending on the drag operation (as the display control means), and causes the vibrator 32 to perform vibration operation in the vibration mode depending on the moving amount of the object 71 in the object display area 70 in response to the drag operation (as the vibration control means). Therefore, the user can intuitively recognize the moving amount of the object 71 in the object display area 70.

Furthermore, by specifying the moving amount of the object 71 based on the moving distance in the Y direction of the object 71 in the object display area 70, the vibration response can be performed based only on the moving amount that affects the arrangement order when the objects 71 are arranged in the Y direction. Therefore, the user can appropriately recognize the arrangement order after the movement based on the vibration response.

Furthermore, because the moving amount of the object 71 in the object display area 70 is specified based on the moving distance of the object 71 in the Y direction and the moving distance in the X direction that is orthogonal to the Y direction, the vibration response can be performed reflecting the position of the moving object 71 in the matrix where the objects 71 are arranged as in Modification 2.

Furthermore, because the moving amount of the object 71 in the object display area 70 is specified based on the linear distance between the movement start position of the object 71 and the position of the object 71 that is moving, the vibration response can be also performed reflecting the position of the moving object 71 in the matrix where the objects 71 are arranged as in Modification 2.

Furthermore, the objects that are associated with respective arrangement numbers, and the controller 10 causes the objects 71 to be arranged and displayed in the object display area 70 in an order according to the arrangement numbers. In response to start of the drag operation, depending on movement of the object 71 that is selected among the objects in response to the drag operation, the controller 10 exchanges an arrangement number of the selected object for an arrangement number of another object 71 and causes the objects 71 to be arranged and displayed according to the arrangement numbers after the exchange (as the display control means). In this case, since the moving amount of the object 71 is the difference between the arrangement numbers of the selected object 71 after the exchange and at the start of the movement, the user can easily and intuitively recognize the amount of change in the arrangement order of the objects from the vibration response.

Furthermore, in Modification 2, the controller 10 (display control means) arranges the plurality of objects 71 to form a matrix in the object display area 70. The objects 71 in the respective rows of the matrix are arranged such that the objects closer to an edge of the matrix are associated with a smaller arrangement number, and the objects 71 in the respective columns of the matrix are arranged such that the objects closer to another edge of the matrix are associated with a smaller arrangement number. In this way, when the objects are arranged in a matrix, the user can easily and intuitively recognize the amount of change in the arrangement order of the objects from the vibration response.

Furthermore, in Modification 3, the controller 10 displays the objects 71 in either the rearrange mode (first mode) in which the objects 71 are moved in the object display area 70 depending on the drag operation, or the normal mode (second mode) in which the objects 71 are not moved in the object display area 70. The controller 10 (display control means) does not use exchange of the object 71 with the temporary set object 72 to calculate the moving amount. Among the plurality of objects, the temporary set object 72 is displayed in the rearrange mode and hidden in the normal mode. As a result, the vibration response can be performed based on the moving amount that is converted to the moving amount in the arrangement in the normal mode in which the temporary set object 72 is hidden. Therefore, the user can intuitively recognize the position of the object 71 when the operation mode returns to the normal mode.

In control method A of Modification 1, the controller 10 displays, on the display 31, a portion of the object display area 70 along with the object(s) 71. When an object 71 is moved outside the displayed portion of the object display area 70 in response to the drag operation, the controller 10 (display control means) causes the object display area 70 to scroll across the operation screen 311a of the display 31 in response to movement of the object 71. The controller 10 (vibration control means) performs the vibration operation in a predetermined limit vibration mode when the moving amount of the object 71 is the maximum possible moving amount that can result in scrolling across the operation screen 311a. Therefore, even when the movement of the object 71 is large and causes scrolling, the user can easily and intuitively recognize the moving amount of the object 71 in the object display area 70 based on the vibration response. Furthermore, even when the scroll bar 311b is hidden by a finger, the user can grasp the moving amount of the object 71 and the range in the object display area 70 that is displayed on the operation screen 311a based on the vibration response.

In control method B of Modification 1, the controller 10 (vibration control means) performs the vibration operation in the predetermined limit vibration mode when the moving amount of the object 71 is the maximum possible moving amount within the displayed range of the operation screen 311a. According to this, the user can easily and intuitively recognize that the object 71 has moved to the edge of the operation screen 311a as the vibration response is in the limit vibration mode.

Furthermore, in Modification 4, the controller 10 (display control means) displays, on the display 31, a part of the object display area 70 together with the object 71, changes the range of the object display area 70 to be displayed on the display 31 in response to the drag operation, and moves the object 71 together with the part of the object display area 70. The controller 10 (vibration control means) causes the vibrator 32 to perform the vibration operation in a vibration mode depending on the moving amount of the object 71 in the operation screen 311a of the display 31 in response to the drag operation. Also with such an embodiment, the user can easily and intuitively recognize the moving amount of the object 71 based on the vibration response.

The limit vibration mode is a vibration mode in which the strength of the vibration is the maximum, the vibration mode in which the repetition count of the vibration is maximized, or the vibration mode in which duration of the vibration is the longest, or the like. According to these modes, the user can intuitively grasp the limit vibration mode.

Furthermore, the control method of the image forming apparatus 1 according to the first embodiment includes display controlling in which at least a portion of the object display area 70 and the object 71 that is at a determined position in the object display area 70 are displayed on the display 31; and vibration controlling in which the vibration operation by the vibrator 32 is controlled. In the display controlling, in response to the drag operation on the operation surface 313a of the touch panel 313, the object 71 that is displayed on the display 31 is moved. In the vibration controlling, the vibrator 32 performs the vibration operation in a vibration mode depending on the moving amount of the object 71 in response to the drag operation. By operating the image forming apparatus 1 using this control method, the user can easily and intuitively recognize the moving amount of the object 71 up to that time, while performing the drag operation.

According to the first embodiment, the program 131 causes the controller 10 as a computer provided in the image forming apparatus 1 to function as the display control means that displays at least a portion of the object display area 70 and the object 71 that is at a determined position in the object display area 70 are displayed on the display 31; and as the vibration control means that controls the vibrator 32 to cause the vibration operation. The display control means moves the object 71 that is displayed on the display 31 in response to the drag operation on the operation surface 313a of the touch panel 313. The vibration control means causes the vibrator 32 to perform the vibration operation in a vibration mode depending on a moving amount of the object 71 in response to the drag operation. By operating the image forming apparatus 1 using this program, the user can easily and intuitively recognize the moving amount of the object 71 up to that time while performing the drag operation.

Second Embodiment

Next, the second embodiment will be explained. In the followings, the differences from the first embodiment will be explained, and the points common to the first embodiment will be omitted.

Figure 19:
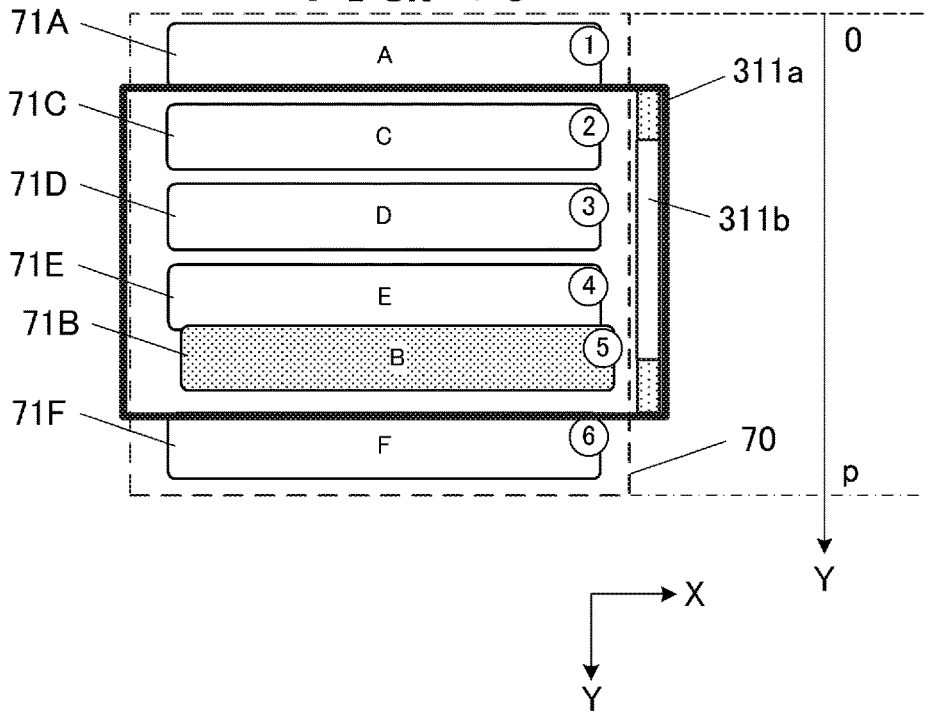
FIG. 19 is a diagram explaining a control method of vibration response according to a second embodiment.

FIG. 19 is a diagram explaining the control method of the vibration response according to the second embodiment.

In this embodiment, when the movement of the object 71 is started in response to the drag operation, the position of the object 71 is specified at each time during the movement, and the vibrator 32 performs the vibration operation in a vibration mode depending on the specified position. In other words, in this embodiment, regardless of the moving amount of the object 71, the vibration mode of the vibration response is determined based only on the position of the object 71 in the object display area 70 at each time.

Here, the position of the object 71 is represented, for example, by an arrangement number that is larger in the +Y direction. Alternatively, the position of the object 71 may be represented by the position coordinate in the Y direction in the object display area 70, with the edge of the −Y direction side of the object display area 70 as the origin.

Figure 20A:
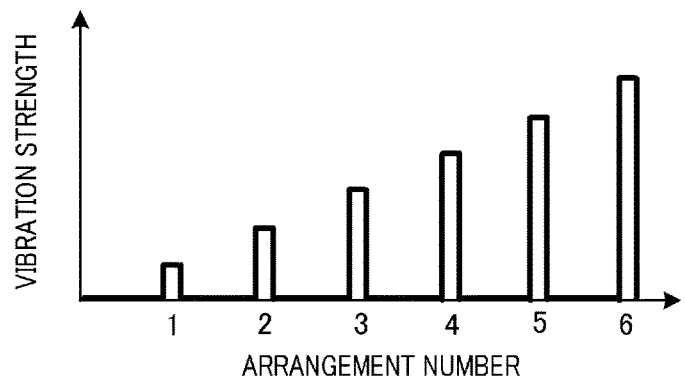
FIG. 20A to FIG. 20B show examples of a change in vibration pattern and vibration strength in the second embodiment.
Figure 20B:
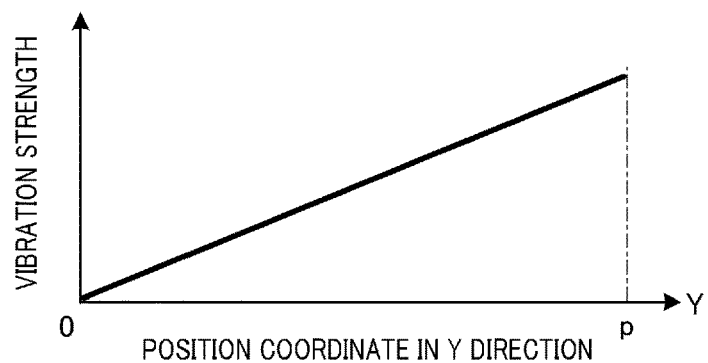

FIG. 20A and FIG. 20B show examples of changes in the vibration pattern and the vibration strength according to the second embodiment.

FIG. 20A shows the example of the vibration pattern when the position of the object 71 is represented by the arrangement number. In this example, the vibration strength increases as the arrangement number increases, that is, the vibration strength is the minimum when the arrangement number of the moving object 71 is the minimum ("1"), and the vibration strength is the maximum when the arrangement number of the moving object 71 is the maximum ("6"). Here, the amount of increase in the vibration strength when the arrangement number increases by one (i.e., the amount of increase in the vibration strength for each exchange of the object 71) is fixed. In this case, the amount of increase in the vibration strength for each exchange of the object 71 can be calculated by dividing the maximum value of the vibration strength by the maximum value of the arrangement number, but is not limited thereto. In the vibration pattern of this embodiment, the vibration strength may increase nonlinearly with the arrangement number.

The vibration mode when the arrangement number is the maximum may be any mode among the limit vibration modes described above. The change in vibration strength with respect to the arrangement number may be reversed from FIG. 20A. That is, the vibration strength may be maximized when the arrangement number is minimized, and the vibration strength may be minimized when the arrangement number is maximized.

FIG. 20B shows an example of the change in vibration strength when the position of the object 71 is represented by the position coordinate in the Y direction. In this example, the vibration strength increases as the position coordinate increases, that is, the vibration strength is the minimum when the position coordinate is zero ("0"), and the vibration strength is the maximum when the position coordinate is "p". FIG. 20B shows an example where the vibration strength is increased continuously (analogically) as the position coordinate is increased, but is not limited thereto. The vibration strength may be increased in a stepwise (digital) manner as the position coordinate is increased. Alternatively, the vibration strength may be increased non-linearly with respect to the position coordinate. Alternatively, the change in the vibration strength with respect to the position coordinate may be reversed from FIG. 20B. That is, the vibration strength may be maximized when the position coordinate is minimized (0), and the vibration strength may be minimized when the position coordinate is maximized (p).

Figure 21:
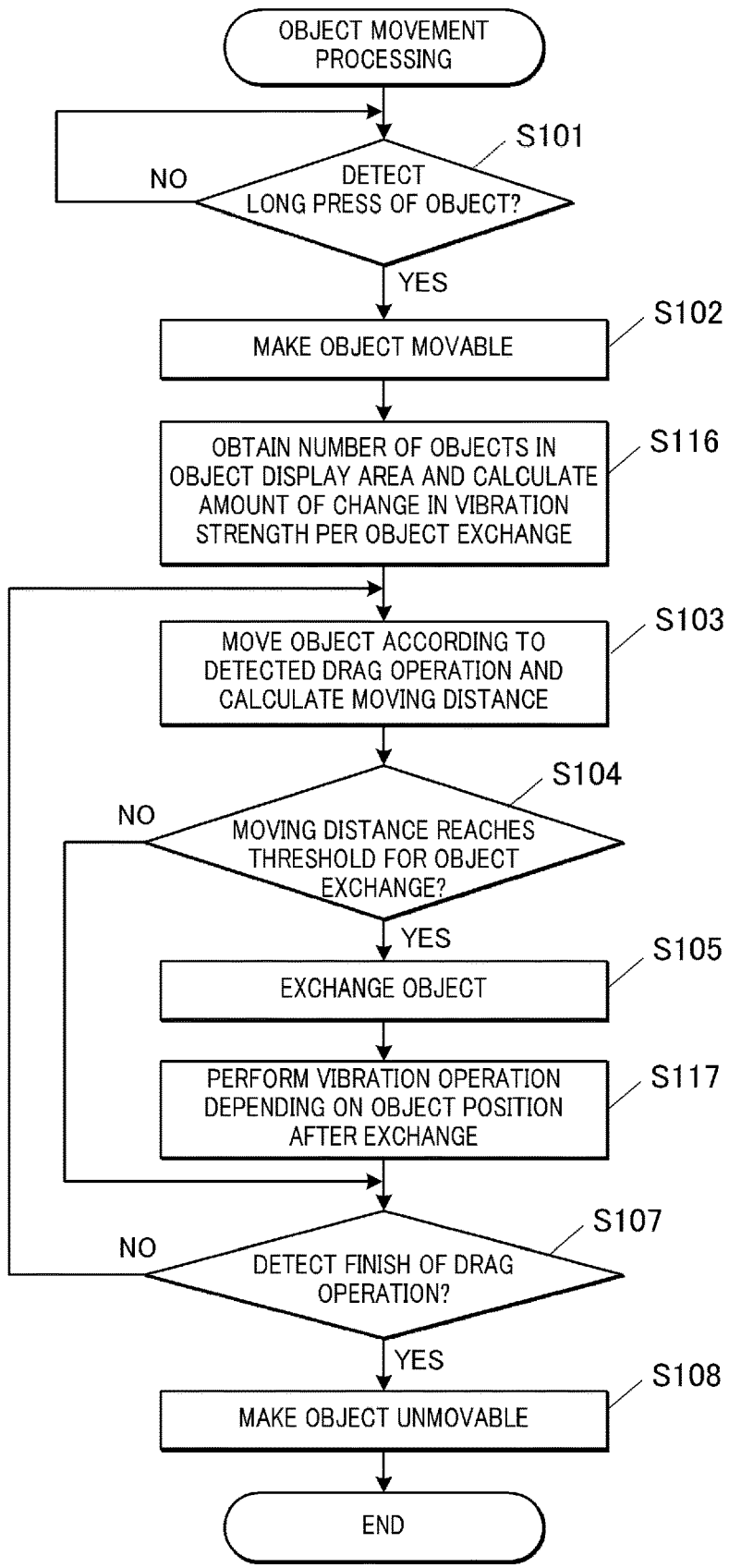
FIG. 21 is a flowchart showing a control procedure of the object movement processing in the second embodiment.

FIG. 21 is a flowchart showing the control procedure of the object movement processing by the controller 10 in the second embodiment.

The flowchart in FIG. 21 shows the object movement processing when the position of the object 71 is represented by the arrangement number, as in FIG. 20A. The flowchart of FIG. 21 corresponds to the flowchart of FIG. 7 in the first embodiment (first control method of the vibration response) with the deletion of step S106 and the addition of steps S116 and S117. In the followings, the differences from the flowchart in FIG. 7 will be explained.

When the operation mode shifts to the rearrange mode and the object 71 becomes movable in step S102, the controller 10 obtains the number of objects 71 in the object display area 70 (that is, the maximum arrangement number) and calculates the amount of change in the vibration strength for each exchange of the objects 71 (step S116). Based on this calculation result, the controller 10 specifies the vibration strength corresponding to each arrangement number.

When the arrangement number of the moving object 71 is exchanged for that of the neighboring object 71 in step S105, so that the display position of the moving object 71 is exchanged for that of the neighboring object 71, the controller 10 causes the vibrator 32 to perform a vibration operation with the vibration strength depending on the position (in this case, the arrangement number) of the object 71 after the exchange (step S117).

The subsequent processes are the same as those in the flowchart of FIG. 7.

In the flowchart of FIG. 21, steps S103, S104, S105, and S107 correspond to the "display control step", and step S117 corresponds to the "vibration control step".

Figure 22:
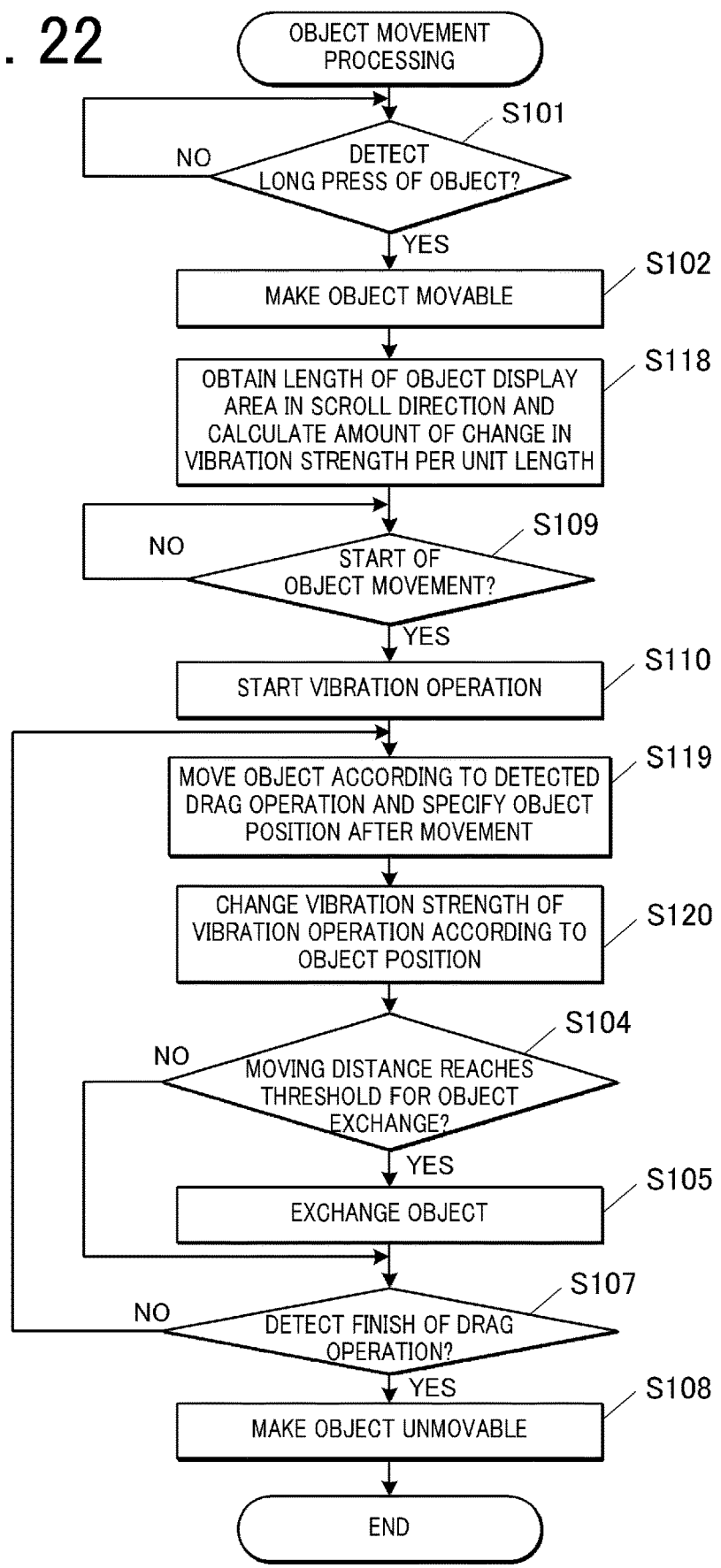
FIG. 22 is a flowchart showing another control procedure of the object movement processing in the second embodiment.

FIG. 22 is a flowchart showing the other control procedure by the controller 10 of the object movement processing in the second embodiment.

The flowchart in FIG. 22 shows the object movement processing when the position of the object 71 is represented by the position coordinate in the Y direction, as in FIG. 20B. The flowchart of FIG. 22 corresponds to the flowchart of FIG. 9 in the first embodiment (second control method of the vibration response) with the addition of step S118 after step S102 and exchanged steps S103 and S111 for steps S119 and S120, respectively. In the followings, the differences from the flowchart in FIG. 9 will be explained.

When the operation mode shifts to the rearrange mode and the object 71 becomes movable in step S102, the controller 10 obtains the length of the object display area 70 in the scroll direction and calculates the amount of change in the vibration strength for each unit length (step S118). Based on this calculation result, the controller 10 specifies the vibration strength corresponding to each position coordinate in the Y direction.

When the vibration operation is started in step S110, the controller moves the object 71 depending on the drag operation and specifies the position of the object 71 after the movement (here, the position coordinate in the Y direction) (step S119). Furthermore, the controller 10 changes the vibration strength of the vibration operation depending on the specified position of the object 71 (step S120). Each time the processes of steps S119, S120, S104, S105, and S107 are repeated, the vibration strength in step S120 is changed and the vibration strength can be continuously changed as shown in FIG. 20B.

The subsequent processes are the same as those in the flowchart of FIG. 9.

In the flowchart of FIG. 22, steps S119, S104, S105, and S107 correspond to the "display control step", and steps S110 and S120 correspond to the "vibration control step".

As described above, the image forming apparatus 1 as an information processing apparatus according to the above second embodiment includes a display 31 that has a touch panel 313; a vibrator 32 that performs a vibration operation to vibrate an operation surface 313a of the touch panel 313; and the controller 10. The controller 10 (as the display control means) displays, on the display 31, at least a portion of the object display area 70 and the object 71 that is at a determined position in the object display area 70; controls the vibration operation by the vibrator 32 (as the vibration control means), in response to the drag operation on the operation surface 313a of the touch panel 313, moves the object 71 that is displayed on the display 31 (as the display control means), and causes the vibrator 32 to perform the vibration operation in a vibration mode depending on the position in the object display area 70 of the object 71 that is moved in response to the drag operation (as the vibration control means).

According to such a configuration, the user can perceive the vibration response in the vibration mode depending on the moving amount of the object 71 from the operation surface 313*a*. Therefore, the user can easily and intuitively recognize the position of the moving object 71 in the object display area 70, while performing the dragging operation.

Furthermore, the controller 10 (vibration control means) changes at least one of the vibration strength and vibration pattern in the vibration operation depending on the position of the moving object 71 in the object display area 70. Therefore, the user can easily and intuitively recognize the position of the moving object 71 based on the vibration strength or vibration pattern.

Furthermore, the objects that are associated with respective arrangement numbers, and the controller 10 causes the objects 71 to be arranged and displayed in the object display area 70 in an order according to the arrangement numbers. In response to start of the drag operation, depending on movement of the object 71 that is selected in response to the drag operation, the controller 10 exchanges an arrangement number of the selected object for an arrangement number of another object 71 and causes the objects 71 to be arranged and displayed according to the arrangement numbers after the exchange (as the display control means). In this case, since the position of the object 71 is specified based on the arrangement number of the object 71 after the exchange, the user can easily and intuitively recognize the position of the moving object 71 in the arranged objects from the vibration response.

Furthermore, the controller 10 displays a portion of the object display area 70 with the object 71 on the display 31, upon moving the object 71 in response to the drag operation outside the portion that is displayed in the object display area 70, the controller 10 causes the object display area 70 to scroll across the operation screen 311*a* of the display 31 in response to movement of the object 71 (as the display control means). Upon the object 71 having moved to a position at an edge of the object display area 70 in a scroll direction across the operation screen or an opposite direction to the scroll direction, the controller 10 causes the vibrator 32 to perform the vibration operation in a predetermined limit vibration mode (as the vibration control means). Therefore, even when the movement of the object 71 is large and causes scrolling, the user can easily and intuitively recognize the position of the object 71 in the object display area 70 based on the vibration response. Furthermore, even when the scroll bar 311*b* is hidden by a finger, the user can grasp the position of the object 71 and the range in the object display area 70 that is displayed on the operation screen 311*a* based on the vibration response.

Furthermore, the control method of the image forming apparatus 1 according to the second embodiment includes: display controlling in which at least a portion of a predetermined object display area and an object 71 that is at a determined position in the object display area 70 are displayed on the display 31; and vibration controlling in which the vibration operation by the vibrator 32 is controlled. In the display controlling, in response to the drag operation on the operation surface 313*a* of the touch panel 313, the object 71 that is displayed on the display 31 is moved in the object display area 70. In the vibration controlling, the vibrator 32 performs the vibration operation in a vibration mode depending on a position in the object display area 70 of the object 71 that is moved in response to the drag operation. By operating the image forming apparatus 1 using this control method, the user can easily and intuitively recognize the position of the moving object 71 in the object display area 70 while performing the drag operation.

According to the second embodiment, the program 131 causes the controller 10 as a computer provided in the image forming apparatus 1 to function as the display control means that displays at least a portion of the object display area 70 and the object 71 that is at a determined position in the object display area 70 are displayed on the display 31; and as the vibration control means that controls the vibrator 32 to cause the vibration operation. The display control means moves the object 71 that is displayed on the display 31 in the object display area in response to the drag operation on the operation surface 313*a* of the touch panel 313. The vibration control means causes the vibrator 32 to perform the vibration operation in a vibration mode depending on the position in the object display area 70 of the object 71 that is moved in response to the drag operation. By operating the image forming apparatus 1 using this program, the user can easily and intuitively recognize the position of the moving object 71 in the object display area 70 while performing the drag operation.

The present invention is not limited to the above embodiments and modifications, and various changes can be made.

In the above embodiments, an image forming apparatus is shown as an example of the information processing apparatus, but the present invention is not limited to this. The information processing apparatus may be a stationary device other than the image forming apparatus 1, and a portable device such as a smart phone or tablet terminal.

The purpose of moving objects by dragging operation is not limited to changing the arrangement order of objects, but may be adjustment of the display position on the operation screen 311*a* or the like.

The shape and function of the objects moved in response to the drag operation are not limited to those of the operation buttons illustrated in the above embodiments, but may be any shape and function. Therefore, the present invention may be applied to movement of any object other than operation buttons.

The scroll direction across the display screen is not limited to the Y direction (up and down direction when the display screen is viewed from the front), but may be the X direction (left and right direction when the display screen is viewed from the front).

The arrangement number of the object is not limited to a numeral, but may be represented by any sign or symbol that can specify the arrangement order.

Although embodiments of the present invention have been described and illustrated in detail, the disclosed embodiments are made for purposes of illustration and example only and not limitation. The scope of the present invention should be interpreted by terms of the appended claims Detailed configurations and detailed operations of the respective apparatuses which constitute the system described in the above-described embodiment can be changed as appropriate within a scope not deviating from the gist of the present invention.

What is claimed is:

1. An information processing apparatus comprising:
   a display that has a touch panel;
   a controller that displays, on the display, at least a portion of an object display area and an object that is at a position according to an arrangement order with respect to at least another object in the object display area; and a vibrator that performs a vibration operation to vibrate an operation surface of the touch panel;

wherein the controller controls the vibration operation by the vibrator, in response to a drag operation on the operation surface of the touch panel, moves the object that is displayed on the display, changes the arrangement order by exchanging the object responding to the drag operation with an adjacent object if a distance the object is moved in response to the drag operation reaches a predetermined threshold, and causes the vibrator to perform the vibration operation in a vibration mode depending on a moving amount of the object in response to the drag operation, wherein the moving amount is based on a difference between a position of the object before a start of the drag operation and a position of the object after a change in arrangement order.

2. The information processing apparatus according to claim 1, wherein the controller changes at least one of a vibration strength and a vibration pattern in the vibration mode depending on the moving amount.

3. The information processing apparatus according to claim 1, wherein the controller continuously performs the vibration operation during the drag operation and changes the vibration mode depending on the moving amount.

4. The information processing apparatus according to claim 1, wherein the controller predicts end of the drag operation based on at least one of decreasing of a pressure that the operation surface receives from an operation means that performs the drag operation and decreasing of a contact area in the operation surface by the operation means, and upon predicting the end of the drag operation, the controller causes the vibrator to perform the vibration operation in a vibration mode depending on the moving amount.

5. The information processing apparatus according to claim 1, wherein, upon detecting stop of the drag operation, the controller causes the vibrator to perform the vibration operation in a vibration mode depending on the moving amount.

6. The information processing apparatus according to claim 1, wherein, in response to the drag operation, the controller moves the object to be displayed on the display in the object display area, and the controller causes the vibrator to perform the vibration operation in a vibration mode depending on the moving amount of the object in the object display area in response to the drag operation.

7. The information processing apparatus according to claim 6, wherein the moving amount is specified based on a moving distance in a first direction of the object in the object display area.

8. The information processing apparatus according to claim 6, wherein the moving amount is specified based on a first moving distance in a first direction of the object in the object display area and a second moving distance in a second direction of the object in the object display area, the second direction being orthogonal to the first direction.

9. The information processing apparatus according to claim 6, wherein the moving amount is specified based on a linear distance between a movement start position of the object and a position of the object that is moving in the object display area.

10. The information processing apparatus according to claim 6, wherein the object includes a plurality of objects that are associated with respective arrangement numbers, the controller causes the objects to be arranged and displayed in the object display area in an order according to the arrangement numbers, in response to start of the drag operation, depending on movement of a selected object that is selected among the objects in response to the drag operation, the controller exchanges an arrangement number of the selected object for another arrangement number of another object among the objects and causes the objects to be arranged and displayed according to the arrangement numbers after the exchange, and the moving amount is a difference between the arrangement number of the selected object after the exchange and an arrangement number at a time of the start of the drag operation.

11. The information processing apparatus according to claim 10, wherein the controller arranges the objects such that the objects form a matrix in the object display area, such that, in respective rows of the matrix, the objects closer to an edge of the matrix are associated with a smaller arrangement number, and such that, in respective columns of the matrix, the objects closer to another edge of the matrix are associated with a smaller arrangement number.

12. The information processing apparatus according to claim 10, wherein the controller displays the objects in the object display area in one of a first mode in which the objects are moved depending on the drag operation and a second mode in which the objects are not moved, and the controller does not calculate the moving amount based on exchanging of the arrangement numbers for a specific object among the objects that is displayed in the first mode but is not displayed in the second mode.

13. The information processing apparatus according to claim 6, wherein the controller displays a portion of the object display area and an object that is at a determined position in the object display area, upon moving the object in response to the drag operation outside the portion that is displayed in the object display area, the controller causes the object display area to scroll across a display screen of the display in response to movement of the object, and upon the moving amount being a maximum possible moving amount that can result in scrolling across the display screen, the controller causes the vibrator to perform the vibration operation in a predetermined limit vibration mode.

14. The information processing apparatus according to claim 13, wherein the limit vibration mode is one of a vibration mode in which a vibration strength is maximized, a vibration mode in which a repetition count of the vibration is maximized, and a vibration mode in which duration of the vibration is longest.

15. The information processing apparatus according to claim 6, wherein the controller displays a portion of the object display area and an object that is at a determined position in the object display area, upon moving the object in response to the drag operation outside the portion that is displayed in the object display area, the controller causes the object display area to scroll across a display screen of the display in response to movement of the object, and upon the moving amount being a maximum possible moving amount within an area being displayed in the display screen, the controller causes the vibrator to perform the vibration operation in a predetermined limit vibration mode.

16. The information processing apparatus according to claim 1, wherein the controller displays a portion of the object display area and an object that is at a determined position in the object display area, in response to the drag operation, the controller changes a range of the object display area to be displayed on the display and moves the object with the portion of the object display area, and the controller causes the vibrator to perform the vibration operation in a vibration mode depending on the moving amount of the object within a display screen of the display in response to the drag operation.

17. The information processing apparatus of claim 1, wherein the vibration mode is proportional to the moving amount.

18. An information processing apparatus comprising:
a display that has a touch panel;
a controller that displays, on the display, at least a portion of an object display area and an object that is at a position according to an arrangement order with respect to at least another object in the object display area; and
a vibrator that performs a vibration operation to vibrate an operation surface of the touch panel;
wherein the controller
controls the vibration operation by the vibrator,
in response to a drag operation on the operation surface of the touch panel, moves the object that is displayed on the display within the object display area,
changes the arrangement order by exchanging the object with an adjacent object if a distance the object is moved in response to the drag operation reaches a predetermined threshold, and
causes the vibrator to perform the vibration operation in a vibration mode depending only on a specified position in the object display area of the object that is moved in response to the drag operation at each time, regardless of a moving amount of the object.

19. The information processing apparatus according to claim 18, wherein the controller changes at least one of a vibration strength and a vibration pattern in the vibration operation depending on the position in the object display area of the object that is moved.

20. The information processing apparatus according to claim 18, wherein the object and the at least another object are associated with respective arrangement numbers according to the arrangement order, the controller causes the objects to be arranged and displayed in the object display area in the arrangement order according to the arrangement numbers, in response to start of the drag operation, depending on movement of a selected object that is selected among the objects in response to the drag operation, the controller exchanges an arrangement number of the selected object for another arrangement number of another object among the objects and causes the objects to be arranged and displayed according to the arrangement numbers after the exchange, and the controller specifies the position of the object based on the arrangement number of the selected object after the exchange.

21. The information processing apparatus according to claim 18, wherein the controller displays a portion of the object display area with the object on the display, upon moving the object in response to the drag operation outside the portion that is displayed in the object display area, the controller causes the object display area to scroll across an operation screen of the display in response to movement of the object, and upon the object having moved to a position at an edge of the object display area in a scroll direction across the operation screen or an opposite direction to the scroll direction, the controller causes the vibrator to perform the vibration operation in a predetermined limit vibration mode.

22. A control method of information processing apparatus that includes a display that has a touch panel and a vibrator that performs a vibration operation to vibrate an operation surface of the touch panel, the control method comprising:

display controlling in which at least a portion of an object display area and an object that is at a position according to an arrangement order with respect to at least another object in the object display area are displayed on the display; and vibration controlling in which the vibration operation by the vibrator is controlled, wherein in the display controlling, in response to a drag operation on the operation surface of the touch panel, the object that is displayed on the display is moved, and in the display controlling, the arrangement order is changed by exchanging the object with an adjacent object if a distance the object is moved in response to the drag operation reaches a predetermined threshold, and in the vibration controlling, the vibrator performs the vibration operation in a vibration mode depending on a moving amount of the object in response to the drag operation, wherein the moving amount is based on a difference between a position of the object before a start of the drag operation and a position of the object after a change in arrangement order.

23. A control method of information processing apparatus that includes a display that has a touch panel and a vibrator that performs a vibration operation to vibrate an operation surface of the touch panel, the control method comprising:

display controlling in which at least a portion of an object display area and an object that is at a position according to an arrangement order with respect to at least another object in the object display area are displayed on the display; and vibration controlling in which the vibration operation by the vibrator is controlled, wherein, in the display controlling, in response to a drag operation on the operation surface of the touch panel, the object that is displayed on the display is moved, and in the display controlling, the arrangement order is changed by exchanging the object with an adjacent object if a distance the object is moved in response to the drag operation reaches a predetermined threshold, and in the vibration controlling, the vibrator performs the vibration operation in a vibration mode depending only on a specified position in the object display area of the object that is moved in response to the drag operation at each time, regardless of a moving amount of the object.

24. A non-transitory computer-readable storage medium storing a program causing a computer provided in an image forming apparatus that has a touch panel and a vibrator that performs a vibration operation to vibrate an operation surface of the touch panel as a computer to perform:
display controlling in which at least a portion of an object display area and an object that is at a position according to an arrangement order with respect to at least another object in the object display area are displayed on the display; and
vibration controlling in which the vibration operation by the vibrator is controlled, wherein
in the display controlling, in response to a drag operation on the operation surface of the touch panel, the object that is displayed on the display is moved, and
in the display controlling, the arrangement order is changed by exchanging the object with an adjacent object if a distance the object is moved in response to the drag operation reaches a predetermined threshold, and
in the vibration controlling, the vibrator performs the vibration operation in a vibration mode depending on a moving amount of the object in response to the drag, wherein the moving amount is based on a difference between a position of the object before a start of the drag operation and a position of the object after a change in arrangement order.

25. A non-transitory computer-readable storage medium storing a program causing a computer provided in an image forming apparatus that has a touch panel and a vibrator that performs a vibration operation to vibrate an operation surface of the touch panel as a computer to perform:
display controlling in which at least a portion of an object display area and an object that is at a position according to an arrangement order with respect to at least another object in the object display area are displayed on the display; and
vibration controlling in which the vibration operation by the vibrator is controlled, wherein,
in the display controlling, in response to a drag operation on the operation surface of the touch panel, the object that is displayed on the display is moved in the object display area, and
in the display controlling, the arrangement order is changed by exchanging the object with an adjacent object if a distance the object is moved in response to the drag operation reaches a predetermined threshold, and
in the vibration controlling, the vibrator performs the vibration operation in a vibration mode depending only on a specified position in the object display area of the object that is moved in response to the drag operation at each time, regardless of the moving amount.

* * * * *